US011112596B1

(12) United States Patent
Gabaret

(10) Patent No.: US 11,112,596 B1
(45) Date of Patent: Sep. 7, 2021

(54) ARC SHAPED VISUAL AID

(71) Applicant: Antoine Leon Gabaret, Glendora, CA (US)

(72) Inventor: Antoine Leon Gabaret, Glendora, CA (US)

(\*) Notice: Subject to any disclaimer, the term of this patent is extended or adjusted under 35 U.S.C. 154(b) by 376 days.

(21) Appl. No.: 16/252,626

(22) Filed: Jan. 19, 2019

(51) Int. Cl.
*G02B 25/00* (2006.01)
(52) U.S. Cl.
CPC .................. *G02B 25/002* (2013.01)
(58) Field of Classification Search
CPC ..................... G02B 25/002; G02B 25/005
See application file for complete search history.

(56) References Cited

U.S. PATENT DOCUMENTS

| 1,536,365 | A | * | 5/1925 | Wiseman | ............. | A44C 9/0053 |
| | | | | | | 63/1.12 |
| 1,668,283 | A | | 1/1928 | O'Meara | | |
| 4,133,603 | A | | 1/1979 | Inouye et al. | | |
| 2007/0115427 | A1 | * | 5/2007 | Sauer | ..................... | G02B 7/002 |
| | | | | | | 351/56 |

FOREIGN PATENT DOCUMENTS

| CN | 2357342 | Y | 1/2000 |
| CN | 201831172 | U | 5/2011 |
| CN | 201320080140 | | 2/2013 |
| DE | 202007008693 | U1 | 8/2007 |
| FR | 529738 | | 12/1921 |
| JP | 2000235801 | A | 8/2000 |
| JP | 2004219533 | | 8/2004 |
| JP | 2006215414 | A | 8/2006 |
| JP | 2016071064 | A | 5/2016 |
| KR | 20150001051 | U | 9/2013 |

\* cited by examiner

*Primary Examiner* — Joseph P Martinez
(74) *Attorney, Agent, or Firm* — Law Office of Lewis Brande; Lewis M Brande

(57) ABSTRACT

The device of the current invention is a visual aid that provides for a lens that is attached to a frame that can be connected to a handle. The frame is curved in a way that can allow it to be smaller and be held closer to the eye than existing visual aids. The frame has inner extensions allowing the lens to be attached away from the edges of the frame, making the lens much smaller than the frame itself. This also allows the lens to be placed at a safe and fixed distance close to the eye. When the lens is smaller and when held closer to the eye, the user has the ability to view a wider field of vision than available in the current visual aids. This invention also describes a stick and a ring as examples of handles that can carry the frame with the small lens on it along with inherent utilities more expanded than existing art.

10 Claims, 31 Drawing Sheets

ARC SHAPED VISUAL AID

BACKGROUND OF THE INVENTION

1. Field of the Invention

The present invention is a frame containing a lens that relates to the field of visual aids.

2. Description of the Prior Art

Patent number JP2004219533A by Tamotsu Watanabe in Aug. 5, 2004 discloses a "FINGER LOUPE". The invention is capable of being placed on a finger, such as a thumb, and then be twisted to provide a more useable angle. The invention uses a pivot joint to allow full rotation, and has a magnifier lens detachable attached to the lens holder. This invention is distinguishable from the present invention in that the specific intent of Watanabe's invention is to assist anglers with presbyopia so the device is placed close to the object to be enhanced thus allowing the angler to more easily attach the hook to the line. This device is not intended, nor can it be used in close proximity to the eye as the present invention.

U.S. Pat. No. 1,668,283A (283 Patent) by American Optical Corp from May 1, 1928 discloses a "MAGNIFIER". The '283 patent as noted is substantially different in construction than the present invention. The '283 patent uses the rim to rotatably mount the lens to be secured in the hole defined by the frame member. The frame member has finger grips that the user can hold to use the lens. The lens can be used in its folded position or rotate 90 degrees to a useable position, and can also be rotated to 180 degrees and be used as a conventional magnifier. The disclosure makes specific mention that the frame member is substantially equal to the focal length of the lens. This invention is markedly different in its construction than the present invention. The lens in mounted in a lens holder that is pivotably mounted in a frame, where the frame is designed to the focal length of the lens, and the lens may be secured within the frame. The present invention does not have a specific frame to focal length diameter. In fact, the users ring bears no manufacturing or geometric requirement to the lens. In the present invention the frame has a specific curvature that matches a safety boundary, and the lens-frame apparatus has a specific distance from the cornea of the user's eye for protection. The present invention pivots along an axis parallel to the axis of the ring and not perpendicular to the ring as is shown in the '283 patent.

Patent Number DE202007008693U1 by KOELZ-OTT MONIKA in Aug. 23, 2007 discloses a "MAGNIFYING GLASS FOR RING OR JEWELRY". This patent by Koelz-Ott Monika describes a lens that is held in a holder that is mounted in a ring-like device. The user would "flick" the wrist and the magnifier would be pivoted at a right angle from the axis of the ring into a reading position. While the use of a ring is disclosed the actual use and mounting of the "Monika" patent is substantially different. The present invention uses extensions to secure the lens onto a curved frame that has a window therein, allowing a user to view through the lens at a distance between 2.5 and 3.5 mm from the cornea of the user's eye, or more specifically, the distance is greater than that described by the boundary plane. Additionally, the frame-lens feature of the present invention pivots along the axis of the ring and not at a right angle as described in the Monika patent.

Patent number JP2006215414A by Hiromitsu Hirota from Aug. 17, 2006 discloses a "MAGNIFYING GLASS." This invention is specifically designed to mount a loupe to the thumb or index finger and has a rotating axle mount to magnify the fingertips. In order to improve the visibility of the objects, a LED diode is used to illuminate the objects to be viewed. The lens is attached to a frame which is universally attached to the rotating axle mount. This invention is specifically designed to be removable and not attached to a ring and worn as jewelry as the present invention.

U.S. Pat. No. 4,133,603A by Inouye Hajime from Jan. 9, 1979 discloses an "EXTRA HAND MAGNIFYING GLASS." This patent uses a plastic one-piece body that has a shape wherein the lens can be secured to the frame which is essentially a circular structure. There is an additional circular structure as defined as part of the that is resilient enough to be secured around a user's thumb or finger. The body contains multiple circular structures that cross each other. The patent is specific in use for sewing and reading, but must be held near the printed word or the sewing operations. This devise is specific in that the construction is planar. As previously noted, the one-piece body is flexible and is comprised of circular or sine-wave shaped planar body.

This patent is demonstrably different that the present invention. The one-piece body is flexible and planar where the present invention uses an arcuate shaped frame. The one-piece body must be flexible in order to be used and the lens is secured in a circular portion of the body. The frame in the present invention has extensions to secure prongs that secure the lens.

As has been shown, the prior art typically are positioned on a finger in close proximity to the object to be viewed and enhanced. None of the prior art are designed to be in close proximity to the users cornea, nor are the prior art objects designed with safety in close proximity to the cornea as is the present invention.

SUMMARY OF THE INVENTION

The current invention is a novel form of handheld visual aid. It allows the user to have the optical benefits of a small lens without compromising convenience, esthetics and quality of vision. The lens contained within the device described in this invention is less than 1 cm in size and is placed inconspicuously within a very narrow and discrete compartment housed in a frame smaller than the size of a fingertip. The lens can also be housed in a temporary frame that can be attached to a handle or a finger ring during use then remove when done.

The frame that is housing the very small lens can be integrated with a stick handle or discretely on a piece of jewelry such as a ring. The frame's main function is to contain and hide and the lens. The frame containing the lens can be attached to a stick or a ring permanently or temporarily during use. The frame can be a simple structure or can be made to be esthetically appealing. The lens is transparent, as such it is not visible and allows for more creativity in the design process of the frame, stick or the ring. The frame can be minimalistic in its design and still fulfill its core function of discretely housing the lens.

Making the magnifier optically efficient, discrete and convenient is an objective that is unique to current invention. If placed on a finger ring, the frame can be made completely invisible by rotating the ring around the finger to hide the frame containing the lens on the palmar side of the hand. As such it can be invisible to the surrounding world. The frame is designed in an arc shape to conform to the shape of the ring maximizing its discreteness.

In all previous art pertaining to ring connected magnifiers that we cited below, none considered or described a frame that is curved to conform with the shape of the ting or the cornea of the human eye.

In all previous art pertaining to ring connected magnifiers that we cited below, none considered or described discreteness of the magnifier in their design.

In terms of esthetics of the device in the current invention, it is small enough to allow many designs to be applied to the ring to which it is. The more design is placed on the ring, the more it contributes to one of the main objectives of the invention; distract viewers while user is discretely using of the magnifier.

The user of the magnifier on a finger ring subject to the current invention can conveniently, comfortably, inconspicuously, indefinitely, safely and reliably carry the magnifying lens on the finger. The reliability of not losing this magnifier is the same as that of wearing a ring that many people do for years at a time. The current invention can integrate a lens in any ring of any design and maintain the criteria held and claimed by the current invention. This can be accomplished by connecting the frame to the ring shank on the decorated side of the ring or on the opposite side; the part that is not visible to the surrounding public as it lies on the palmar side of the hand and fingers.

In all previous art pertaining to ring connected magnifiers that we cited below, all called for placing the ring on the finger only during use of the magnifier.

The frame containing the lens is small enough to elude visibility during and between uses. The device in the current invention is carefully designed to avoid compromising quality of vision and ergonomic standards despite the small size of the lens. While most hand held magnifiers are grossly visible in the surrounding vicinity, the current design is unique in its ability to evade being seen by others at all times. The lens used in this invention that is placed within the frame that is described in this invention, can be smaller in size than the smallest contact lenses used on the surface of the eye as well as lenses placed inside the eye following cataract surgery commonly known as intraocular lenses. The lens within the frame of the current invention is the smallest hand held magnifier. Using a very small lens carries challenges that are described and claimed in the unique design aspect of the current invention.

In all previous art pertaining to ring connected magnifiers that we cited below, none considered or described small size of the magnifier as a positive attribute to be considered.

Carrying the device described in this current invention by the user is no more of a burden than wearing a ring; most people wear commitment and wedding rings indefinitely. Using and transporting handheld magnifiers in existing use has the burden of needing a container to put the magnifier in it. Magnifiers are placed in boxes and can be transported in purses and pocket. Risk of losing handheld visual aid of all varieties in existing use is real.

In all previous art pertaining to ring connected magnifiers that we cited below, none included the ability to transport the magnifier at all time while not in use without losing the magnifier as it is considered in the current invention.

The current invention allows for the small lens contained within the frame that is attached to a ring or other handles to be safely brought close to the eye during use. This is achieved due to the unique arc shape of the small frame and the angle at which it is attached to the ring. Placing a small lens close to the eye allows for a broader field of vision to be seen by the user. Safety is achieved when the outer edges of the frame is rested on the skin covering the lower and/or upper eyelids allowing the user to maintain stability and focus as the lens is safely and comfortably positioned close and parallel to the eye.

The current invention claims and intends to respect a safety distance between the visual aid and the cornea of the eye in the process of using the hand-held visual aid. Existing art calls for using the magnifier close to the eye, but at the same time calls for exercising best judgment in maintaining a safe distance. Safe distance is never defined, and consequently current art leans in the direction of designing larger devices with large flat lenses to facilitate the ability of the user in judging what a safe distance is. In fact, the typical loupe lens in current use is 22 mm in diameter, which is large and flat enough that even if the user misjudges the distance and hits the eye, direct contact between the magnifier and the eye is difficult to occur. This is because the eye is covered by the eyelids with only about 8 mm of the eye is exposed to the outside world. These important existing practices have brought to wide use visual aids that have been safe and useful to many for a very long time. The only downside was that the lens and the frame carrying the lens must be large. The current invention intends to propose smaller visual aid that is safe to reliably and safely bring close to the eye during use.

To solve this dilemma the current invention defines what is a safe distance and set the strict design criteria needed to respect such distance.

The proposed safety plane past which the physical elements of the visual aid must not breach is the plane covering the outer skin of the eyelids. Since the thickness of the eyelids is about 3 mm, this virtual safety plane wraps around the eyelids and remains 3 mm above the level of the cornea. By the proposed definition, this safety plane holds the same position whether the eyes are open or closed. For purposes of this presentation, we offer to call this plane the Safety Eyelid Level Plane. The current invention describes a frame that has small flat leading edges that are intended to be place by the user on his/her eyelids of the eye in preparation for use. By using the device to intentionally touch the upper and/or lower eyelids of the open eye by the soft leading edges, the user has safely and predictably placed the device close to the eye.

The current invention describes a visual aid device containing leading edges, structural and optical components in such a way that when the leading edges touch the Eyelid Level Safety Plane all other components are not in breach of such safety plane.

In all previous art pertaining to ring connected magnifiers that we cited below, none incorporated design features to allow for any degree certainty that the use position is safe unless the eye is at an obvious distant. As such bringing existing magnifiers close to the eye is a form of art with a steep learning curve that is facilitated by enlarging the lens; that is opposite of what this invention is intended to accomplish. The current invention calls for a smaller lens and design features that makes it easy and safe for the user.

In the current invention, the frame is designed to firmly anchor the lens without interfering with its optical function. The frame contains a central open window created to allow light rays to travel to and through the lens that is placed in the center of such window.

The frame is also designed for ease of exchange of the lens in the even user desires a lens with stronger or weaker magnification. Exchange is also needed when the lens is worn off. Lens exchange can be achieved without exchanging the frame or the handle. This is achieved by using special prongs to secure the lens in pace. Prongs can also be positioned in a manner that allows for ease of insertion and removal of the lens at will.

In all previous art pertaining to ring connected magnifiers that we cited below, none included design features to exchange the lens with another.

In the current invention, the arc shaped frame is anchored on the ring or handle from one end only. This connection allows the frame to swing into and out of conformity with the ring. The frame can be closed discretely and locked into conformity with the ring while not in use. Alternatively, at the time of use, the frame can be swung back open and away from the ring to expose the lens and allow the user to look through it and to aim at the desired field of vision.

In all previous art pertaining to ring connected magnifiers that we cited below, none considered a lens that is perpendicular to the major plane of the ring and is adjustable in its position as it swings away from the ring for use and swing back close to the ring between uses.

Once the user is done using the visual aid, he/she can swing the frame back to position of conformity with the ring. The frame can then be locked into position to prevent unintended swinging of the frame in and out of position. Locking can be achieved through a variety of means already in existence in the art of jewelry making or the use of magnetic attachments to lock the frame into position.

In the current invention the out swinging of the frame is designed with an angular range 0 to 180 degrees to optimize the convenient, ease, and safe positioning of such frame in front of and close to the eye. The magnitude of the frame angle can be manipulated in the design process to optimize functional positioning of the ring with respect to the frame as it approaches the front of the eye and to maximize the flexibility of use by user based on his/her preference. Such preference can vary due to anatomical variations as well as dexterity preferences. Multidimensional flexibility allows users to achieve optimal lens position and orientation by twisting the ring, adjusting the frame-ring angle, turning the hand and tilting the neck. The design and its effect on the frame-ring angle provide utility effectiveness that is unique to the current invention.

In all previous art pertaining to ring connected magnifiers that we cited below, none incorporated design features to allow for manipulating the lens angle for purposes of optimizing the ability to minimize the lens cornea distance.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENT

Background of the Invention

Existing handheld visual aid tools provide for magnification that requires large lenses. In general, visual aids such as magnifiers are handheld and bulky while in use. When hand held, they allow only for a narrow field of vision, or when designed to allow for a wider field of vision, existing devices must be made bigger and be worn on large frames called eyeglasses. The current invention allows for a wide field magnification, discrete use and transportation without the use of large eyeglasses or bulky magnifiers.

Description of the Preferred Embodiment

The following disclosure encompasses several methods to attach the lens-frame-footing (100), the current invention, to a holding apparatus such as a ring (2) or a holding stick (26) as examples. The lens-frame-footing (100) can also be attached by itself in front of the eye without any holding apparatus by connecting it to an anatomical feature near the eye. All components describing the details of the lens-frame-Footing (100) portion of the invention are identical and do not have unique numerical identifiers.

Figure 1A:
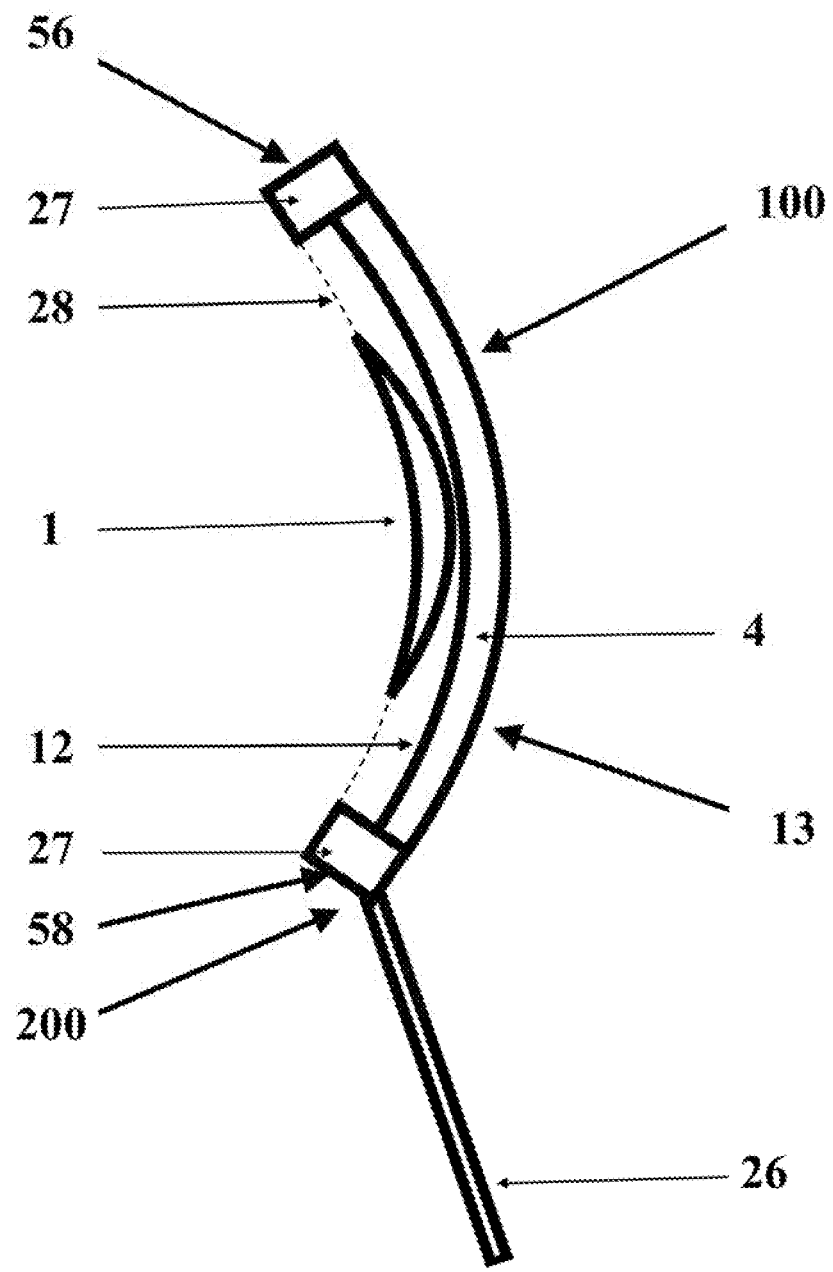
FIG. 1A—Frame on a Stick with a Concavo-Convex Lens
FIG. 1B—Matching Radii of Curvatures
FIG. 2A—Frame on Eyelids-Profile View
FIG. 2B—Frame on a Stick Placed on Eyelids-Frontal View
FIG. 2C—Ring with a Frame on the Eyelids
FIG. 3—Frame on a Stick Bi-Convex Lens
FIG. 4A—Concave View of the Lens Frame
FIG. 4B—Extension in New Invention
FIG. 5—Convex View of the Lens Frame
FIG. 6—Profile View of the Lens Frame
FIG. 7—Safety Eyelid Level Plane
FIG. 8—Profile View Safety Plane
FIG. 9—Concave View Safety Plane
FIG. 10—Tilted View Safety Plane
FIG. 11A—Frame in Locked Position on a Ring-Profile View
FIG. 11B—Frame in Locked Position on a Ring-Top View
FIG. 12A—Frame in Unlocked Position on a Ring-Profile View
FIG. 12B—Frame in Unlocked Position on a Ring-Side View
FIG. 12C—Frame attached to single Loop-Oblique Position
FIG. 13—Lens Prongs Details
FIG. 14A—Safety Lens Cornea Distance-Current Invention
FIG. 14B—Safety Lens Cornea Distance-Existing Art
FIG. 15A—External Loop Tunnel-Full and Open
FIG. 15B—External Loop Tunnel-Full and Closed
FIG. 15C—External Loop Tunnel-Partial and Open
FIG. 15D—External Loop Tunnel-Partial and Closed
FIG. 15E—Internal Tunnel
FIG. 15F—Hybrid Loop Tunnel-Full and Open
FIG. 15G—Hybrid Loop Tunnel-Full and Closed
FIG. 15H—Hybrid Loop Tunnel-Partial and Open
FIG. 15I—Hybrid Loop Tunnel-Partial and Closed
Figure 1B:
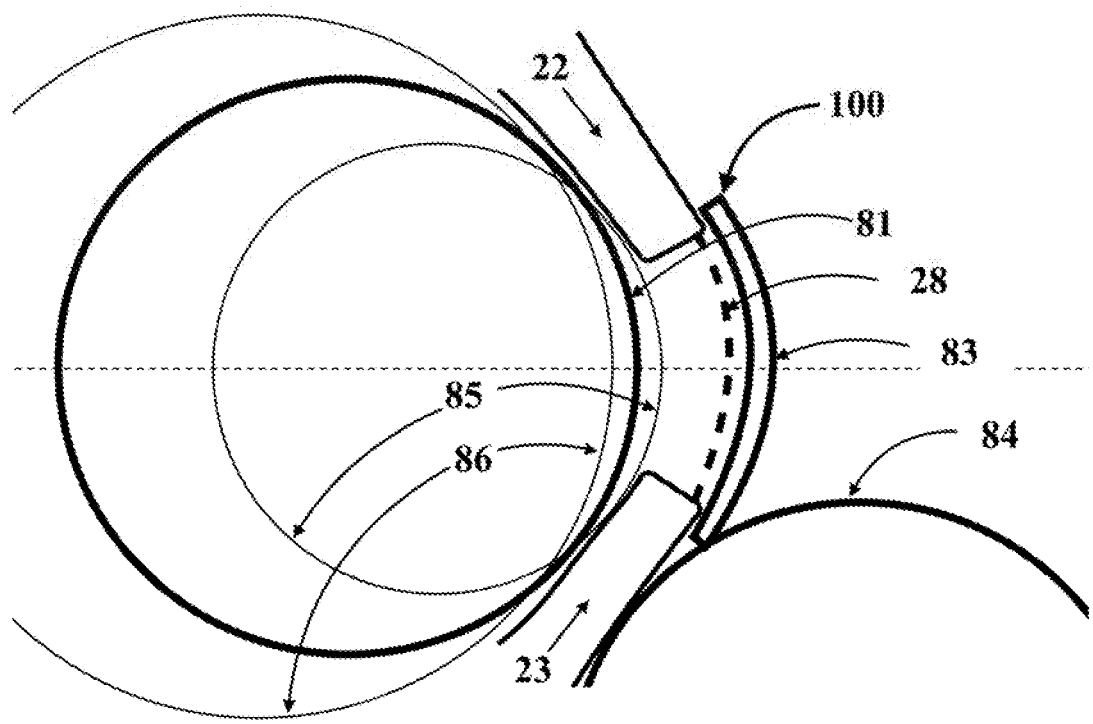
Figure 5:
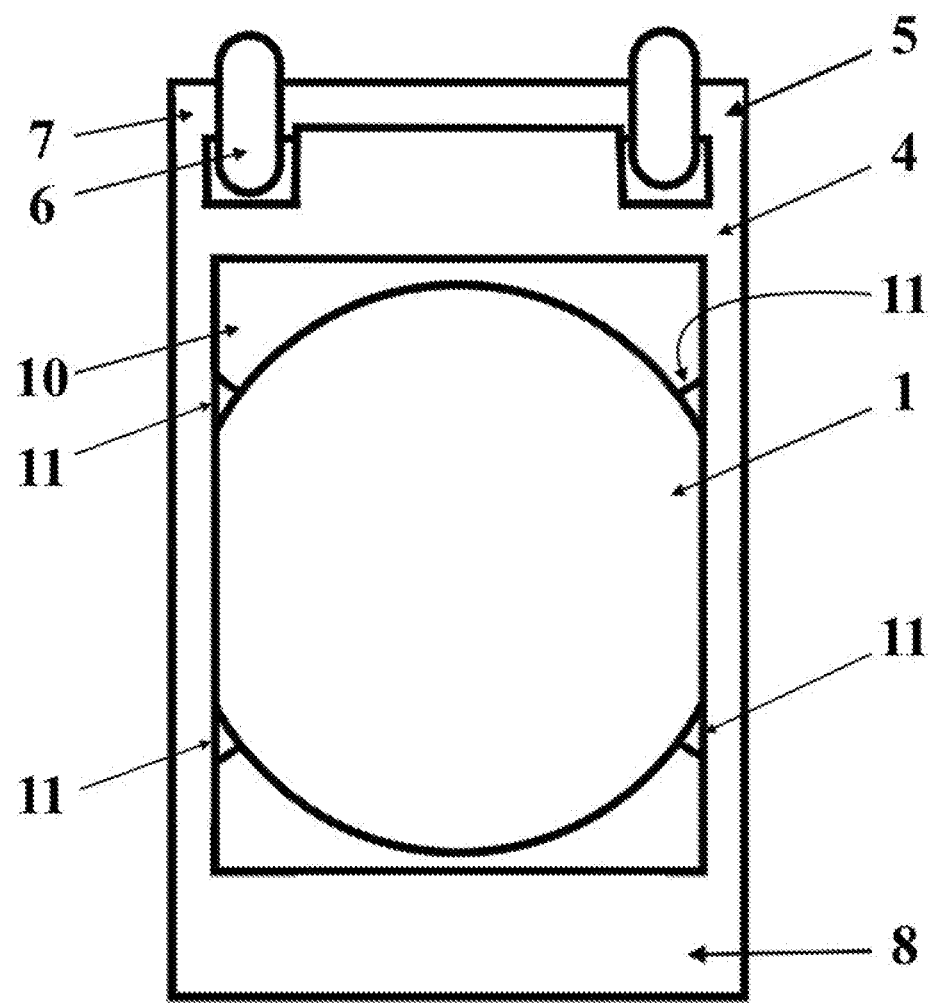
Figure 6:
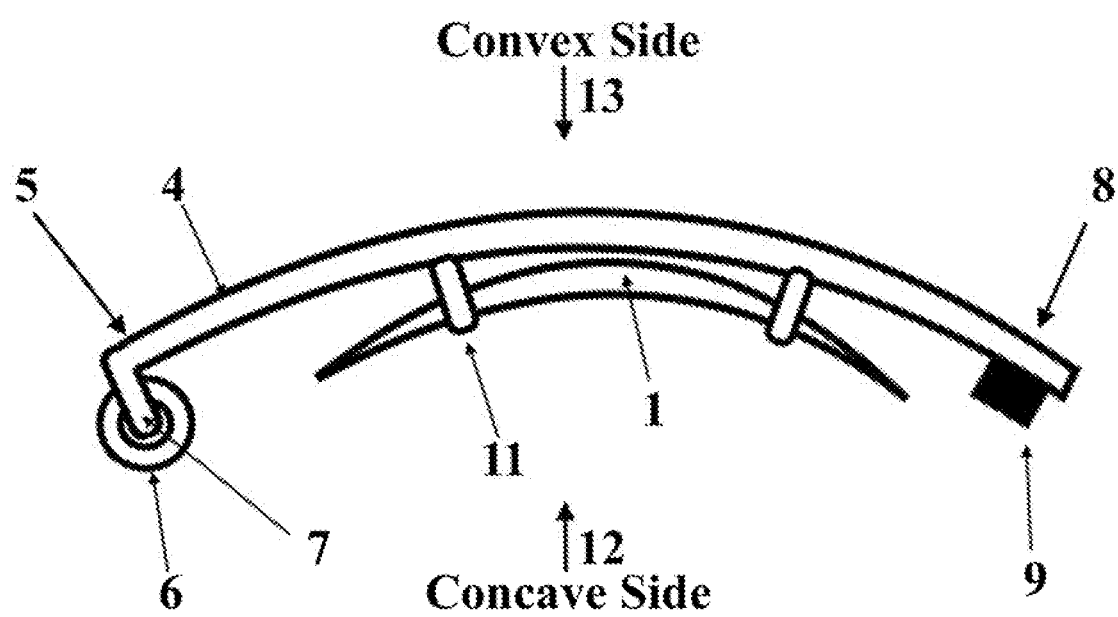

Referring to FIG. 1A we show the present invention (100) that consists of a frame (4) carrying a concavo-convex lens (1), hereinafter "lens", with specific optical power. In one particular embodiment of the invention (200) the frame can be attached to a stick (26). The frame (4) is the central element of the current invention. The frame (4) has a concave side (12) (FIGS. 4, 6) and a convex side (13) (FIGS. 5, 6). The frame (4) is arcuate shaped and has a specific radius (83) (FIG. 1B) that matches and conforms with the radius of the human cornea (25) (FIG. 1B). The frame (4) has at least two outer edge footings (27) one located on the proximal edge (56) and another located on the distal edge (58) that are used to position and stabilize the frame (4) on the upper and lower eyelids (22, 23) during use. The dotted line depicted in FIG. 1A represents a safety boundary (28) which separates the physical elements of the present invention (100) from the vital elements of the human eye. This safety boundary (28) is also named the Safety Eyelid Level Plane (28). The outer edge frame footings (27) support such separation during use as the user positions the frame footings (27) on the upper and lower eyelids (22, 23) keeping all physical elements of the frame (4) from breaching the Safety Eyelid Level Plane (28).

Figure 2A:
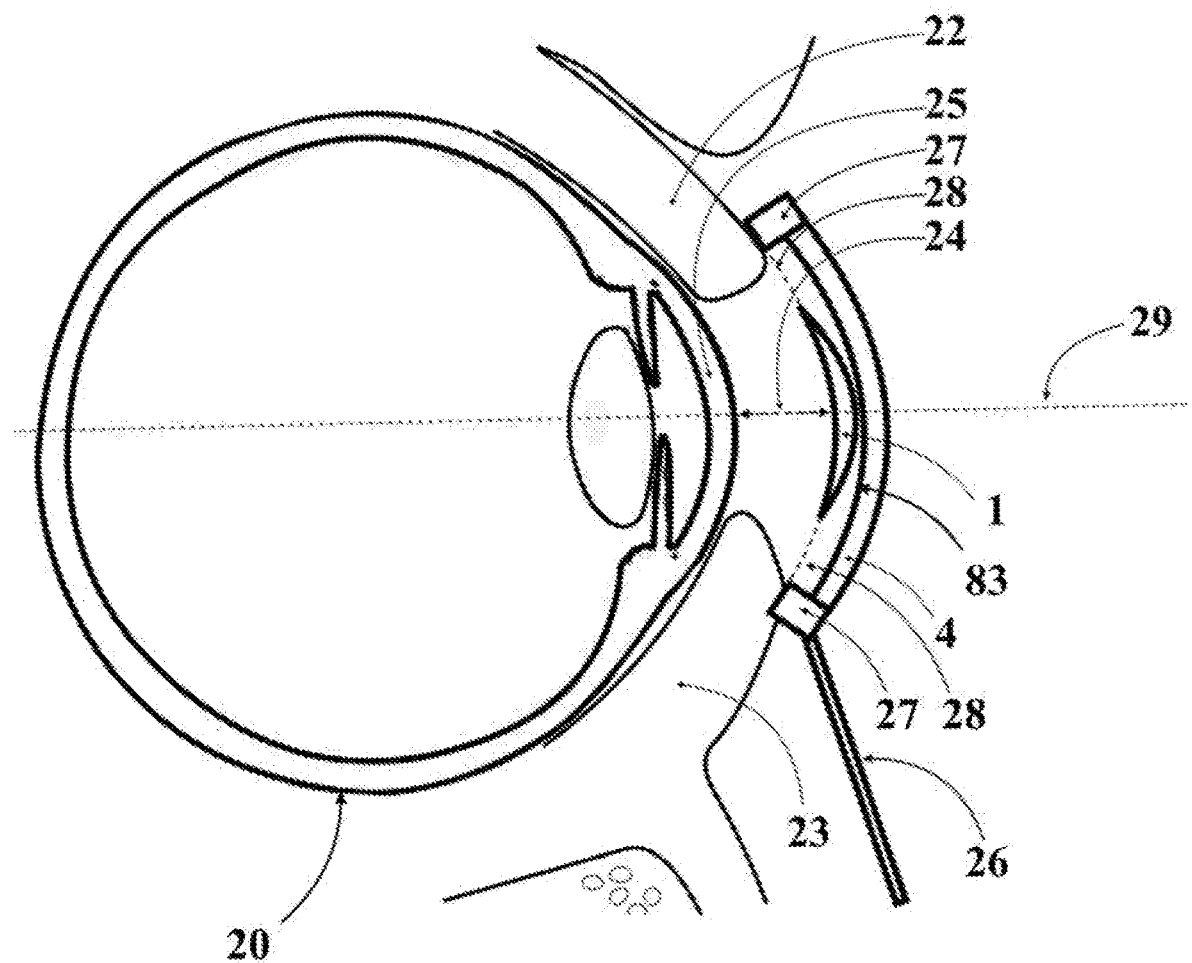
Figure 3:
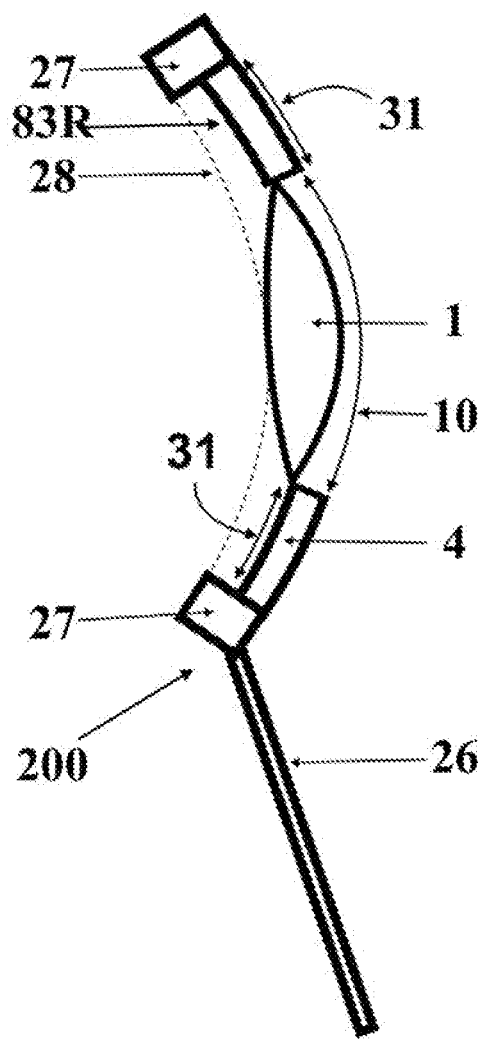

Unlike FIG. 1A that shows a concavo-convex lens on a frame, FIG. 3 represents a profile view of a different type of lens, a bi-convex lens (1) anchored to a frame (4). In one embodiment of the current invention (200) the frame (4) is mounted on a stick (26) which is handheld during use. The frame (4) is arcuate shaped and has a specific radius (83) (FIG. 1B) that matches and conforms with the radius of the human cornea (81) (FIG. 1B). The frame (4) also has extension features (31) allowing the dimensions of the window (10), to be smaller than the frame (4). A smaller window (10) allows for a smaller lens (1). Since the bi-convex lens (1) in FIG. 3 is thicker in the center, it is anchored differently than the concavo-convex lens (1) shown in FIG. 1A. This manipulation is intended to keep the lens (1) within the safety boundary (28) that separates the frame from the human eye (20) (FIG. 2A).

Figure 13:
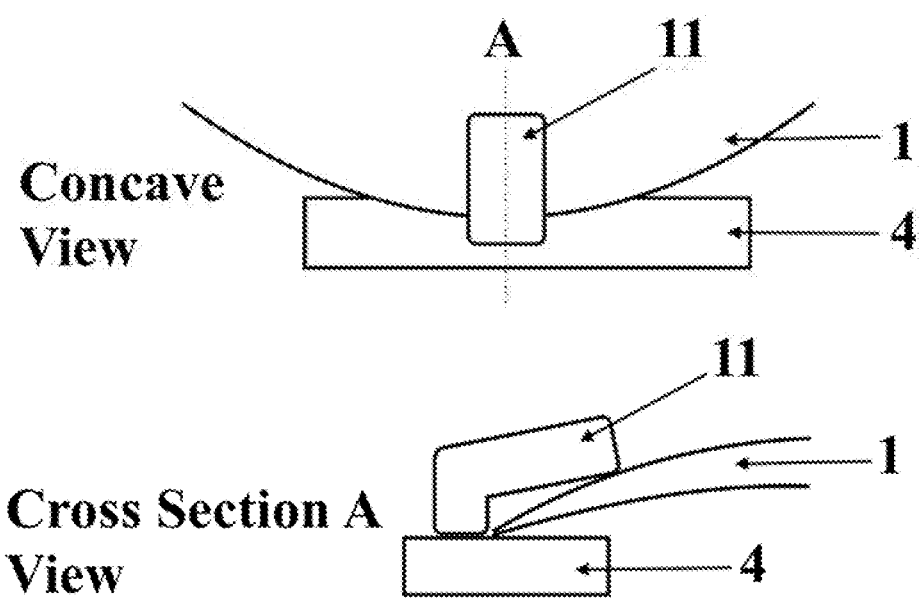

FIG. 6 represents a profile view of the frame (4) of the preferred embodiment. The top part of the figure is the convex side (13) of the frame (4), and the bottom is the concave side (12) of the frame (4). The concavo-convex lens (1), here-in-after referred to as "lens", is anchored to the frame (4) with prongs (11) on the concave side (12) of the frame (4). A locking mechanism (9) is attached to the distal edge (8) of the frame (4) on the concave side (12) of the frame (4) (bottom side of this figure). Prong details are shown in FIG. 13.

Figure 2B:
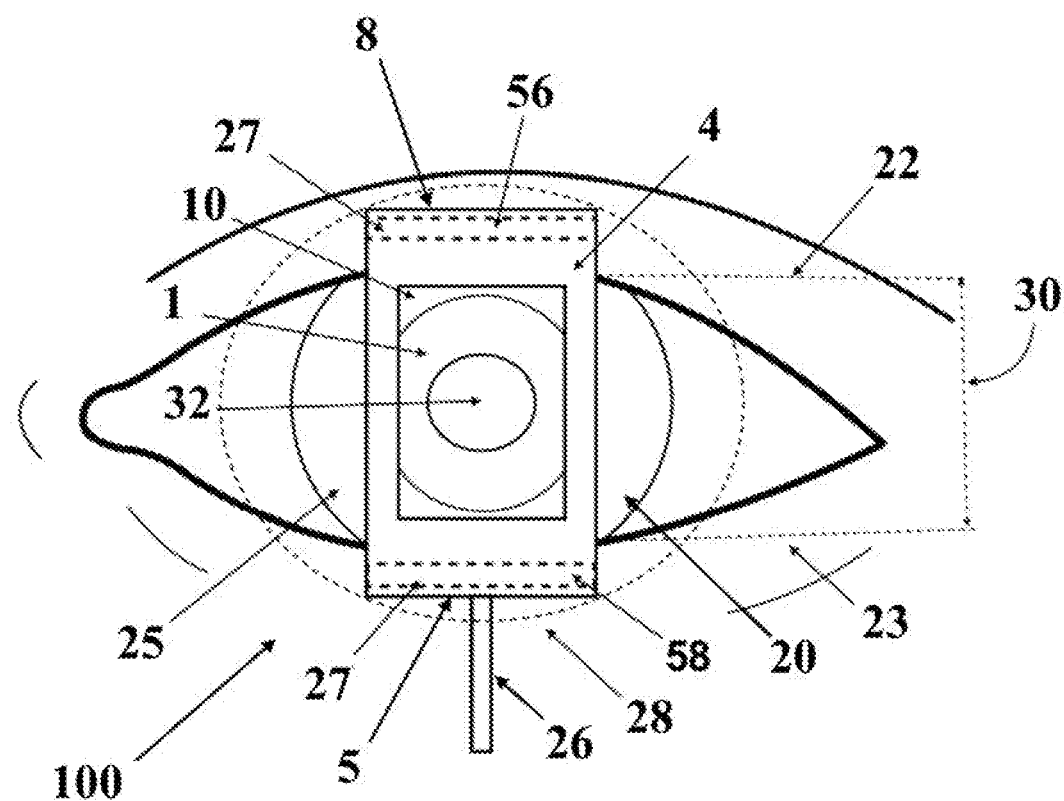
Figure 2C:
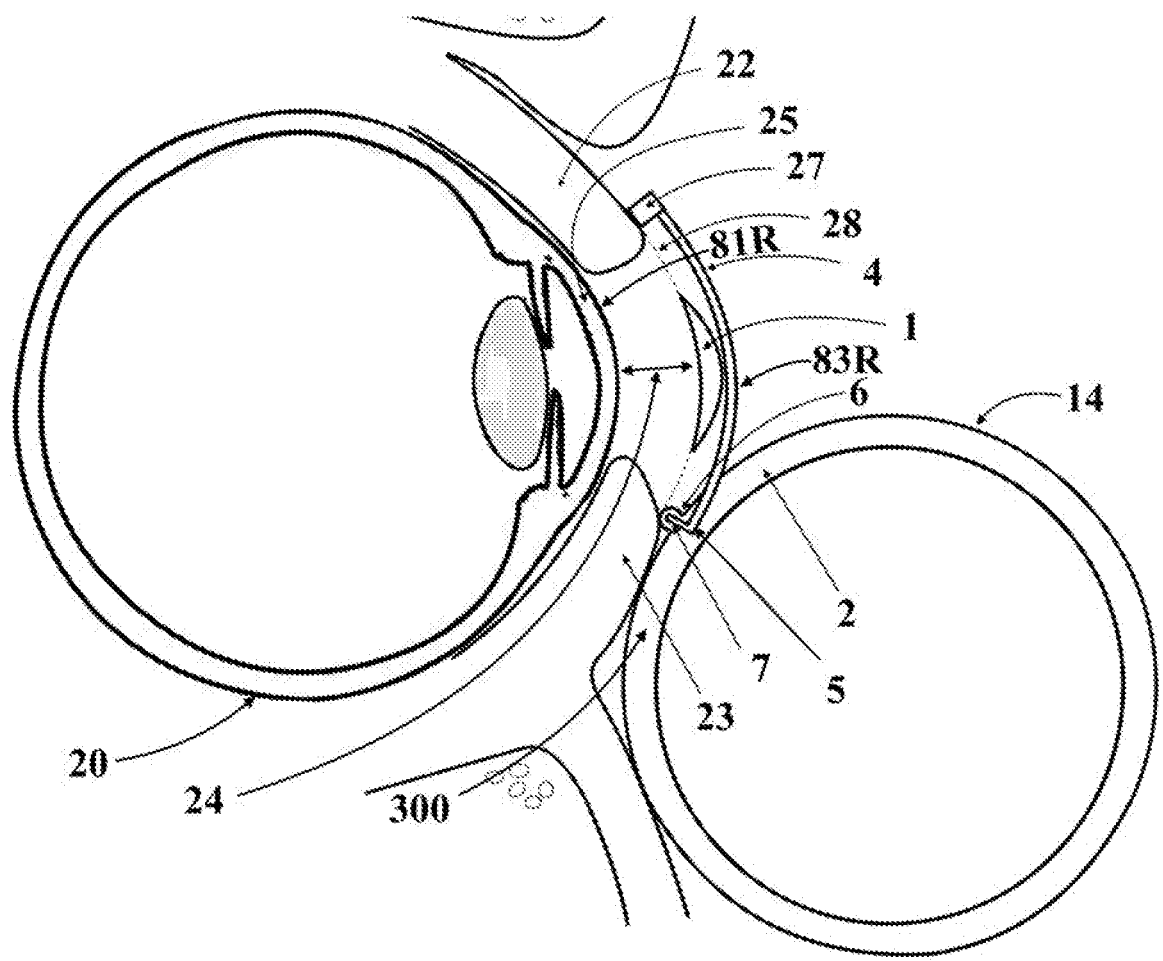

In another preferred embodiment (300) of the invention (100) illustrated in FIG. 2C, the frame (4) is anchored on a ring (2) by attaching loops (6) to the outer surface (14) of the ring (2). The frame (4) is connected to the ring (2) by inserting a rod (7) through the loops (6) at the proximal edge (5) of the frame (4). The arcuate shaped frame (4) having a radius (83) similar to the radius of the periphery (81) of the human cornea (25). The frame (4) can be brought close to the cornea (25) and centered on the visual axis by resting the frame footings (27) on the outer skin layer of the upper and lower eyelids (22, 23). The outward and convex direction of the frame (4) allows the lens to be kept away from the cornea (25). Unlike all other flat plane frames of handheld visual aids in prior art, the present invention (100) prevents the lens (1) and all other physical elements of the frame (4) from breaching the arc shaped 3 mm thick safety barrier we are calling the Safety Eyelid Level Plane (28). This barrier is 3 mm away (24) from the eye and its vital anatomical features. The curvature of the frame (4) can be manipulated to be flatter and steeper based on functional requirements so long as it does not breach the Safety Eyelid Level Plane (28). Such collective spatial arrangement of the elements of the frame (4) leads to a secure separation distance (24) between the cornea (25) and the lens-frame-footing (100) elements of the invention. These essential unique features of the preferred embodiment of the invention (100) allow for the safe ability to limit the distance between the frame elements and the cornea (25) to a critical minimum for the purpose of protecting the eye (20) from any risk of physical injury.

Figure 12A:
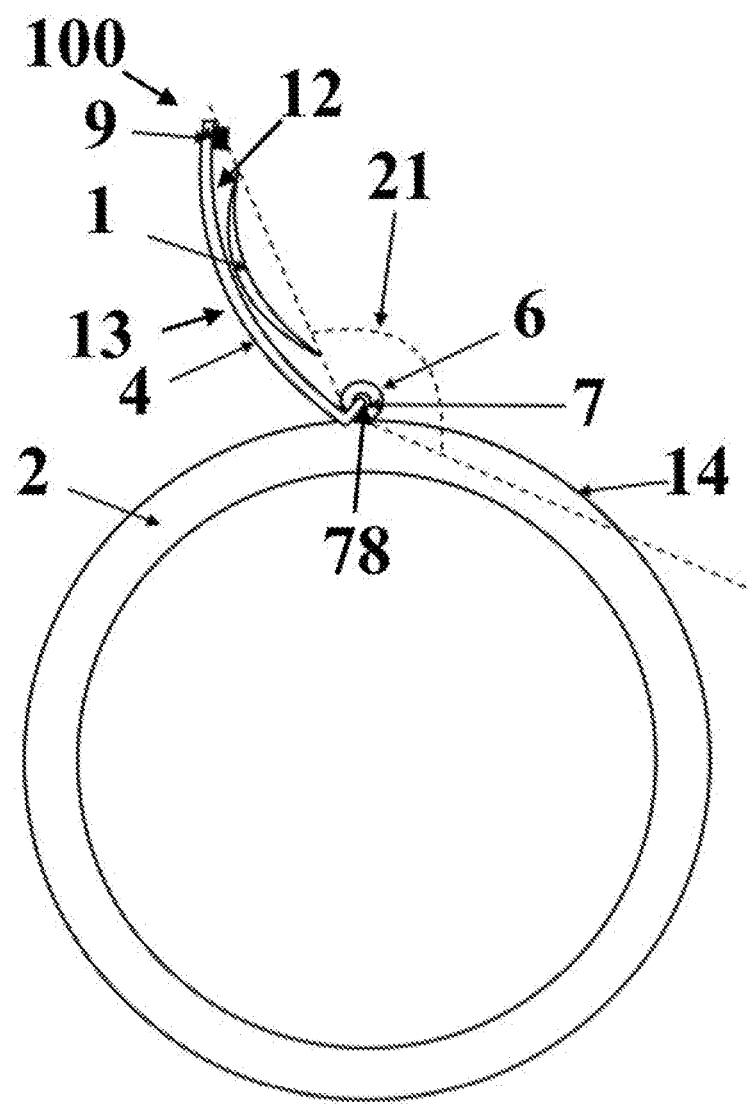

The loops (6) can be placed on the ring (2) in various ways. FIG. 12A illustrates 2 loops (6) placed on the edge of the outer surface of the ring (2).

Another essential element of the current invention (100) illustrated in FIG. 1B is the unique choice of the radius of curvature of the frame (83). The frame (4) is designed to have a radius of curvature (83) that conforms with the radius of curvature of the Safety Eyelid Level Plane (28). The Safety Eyelid Level Plane (28) has a radius of curvature that is close to the radius of the central (85) and peripheral cornea (81). FIG. 1B also illustrates the curvatures of the average ring worn by humans (84), the frame (4) subject to the current invention (100) (83), the Safety Eyelid Level Plane (28), and that of the peripheral cornea (81) as very closely matched curvatures. The numerical representation of the 4 closely matched curvatures is shown in Table 1.

The radius (83) of the frame (4) is designed to be slightly longer than that of the cornea (25) to provide for a frame surface that is flatter than that of the cornea (25). Edges of a flatter frame (4) are softer and safer to place on the upper and lower eyelids (22, 23). In addition to a flatter frame (4) is more visible by the user thus easier to manipulate during use.

The preferred embodiment of the invention (100) can in some situations be a viable substitute for the planar-shaped larger high optical power magnifiers and other visual aids on the basis of convenience and safely using smaller lenses closer to the eye. This same optical principle was used when contact lenses were introduced as a substitute for high prescription glasses. Contact lenses provided much optical relief by using lenses that are much smaller and closer to the eye than eyeglasses, hence allowed higher power and asymmetric optical corrections to be free of aberrations and more functionally tolerated by users. The principle of lenses being smaller and closer of the current invention is also the same as that of intraocular lenses that are placed inside the eye replacing the grotesquely massive thick lenses of aphakic spectacles used following cataract extraction. Intraocular lenses greatly reduced inconvenience and all the adverse optical effects and aberrations and asymmetry associated with thick glasses required after cataract surgery.

Both mentioned prior art (Contact Lenses and Intraocular Lenses) brought life changing benefits to millions on the basis of making smaller lenses and placing them closer to the eye's optical apparatus. Contact Lenses are place on the eye, and Intraocular Lenses are placed inside of it; the device proposed in the current invention (100) is placed outside the eye.

It is critical to emphasize that the unique feature of the current invention (100) is the ability to utilize a very small lens (under 10 mm) attached to a visual aid to safely use it closer to the eye and safer than equivalent existing art; the use of smaller and closer lenses is restricted to hard contact lenses (10 mm) and intraocular lenses (6 mm) in current use. The current invention (100) brings the lens safely close to the eye without placing it on the eye (as in contact lenses) or in the eye (as in intraocular lenses).

Figure 7:
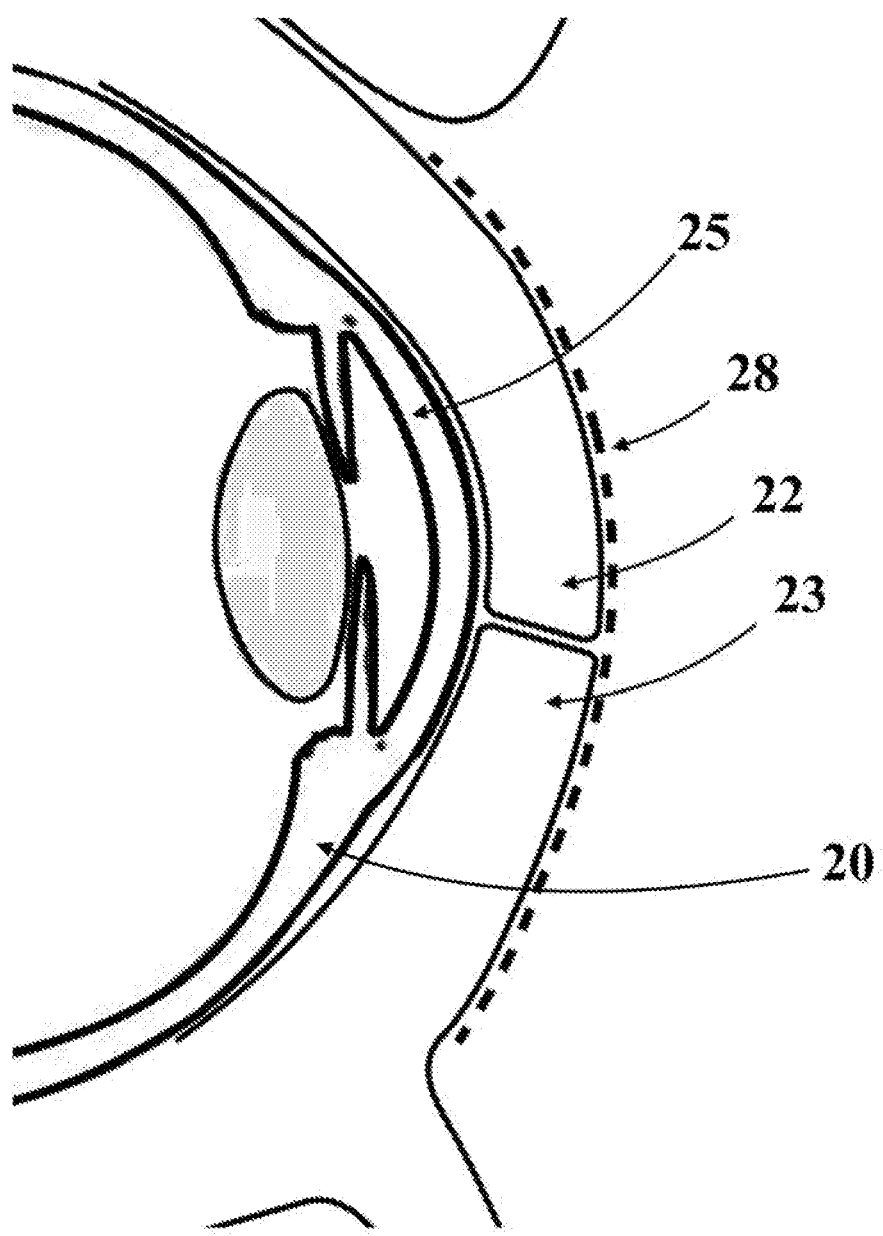

Continuing with FIG. 2A, The Safety Eyelid Level Plane (28) is the virtual spherical cap dome-shaped surface covering the outer skin surface of the upper and lower eyelids (22, 23). The frame outer edge footings (27) in the current invention are specifically oriented to conform to the upper and lower eyelids' (22, 23) outer configuration. The arcuate shape of the frame (4) is specifically curved with a radius (83) to match the curvature of the radius Safety Eyelid Level Plane (28) in the open eyelids position (82) as well as that of the peripheral cornea (25) (FIG. 1B). An essential element of the current invention is the specific size and location of the lens (1) within the frame (4). In addition to the lens (1) being located in the center of the frame (4), in the current invention, the lens (1) is specifically designed to be separated from the cornea (25) by a safety distance (24) equal to the thickness of the eyelids which is about 3 mm. In the design of the current invention, the lens (1) will not encroach into the safety boundary (28) we are referring to in this submission as the Safety Eyelid Level Plane (28). This boundary plane (28) is anatomically located at the level of the skin outer surface of the upper and lower eyelids (22, 23) is also shown in FIG. 7 with the eyelids closed. This safety anatomical boundary plane (28) is fixed in position whether the upper and lower eyelids (22, 23) are open as shown in FIG. 2A or closed, as shown in FIG. 7. The shape of this boundary plane (28) is determined by the fixed shape and location of the cornea (25) and the upper and lower eyelids (22, 23). The frame (4) does not determine the shape of the Safety Eyelid Level Plane (28), rather it is specifically designed and conforms to it. Unlike the existing prior art, the preferred embodiment of the invention (100) is designed with thickness, curvature, and outer edge footings (27) specifically intended to respect the boundary of the outer layer of the eyelids referred to in this presentation as the Safety Eyelid Level Plane (28). Such design's core intention is to be curved and tilted to keep all its structural elements from crossing the Safety Eyelid Level Plane (28) of the human eye (20), preventing injury.

Figure 8:
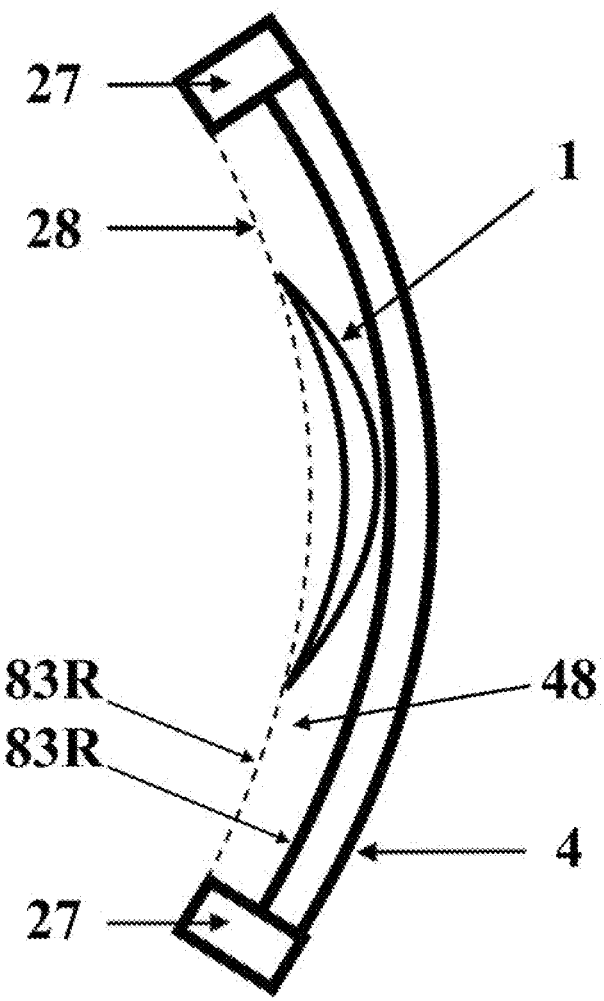

FIG. 8 represents the manner in which the frame (4), lens (1) and footings (27) are designed with the intention to be kept on the convex side (48) of the Safety Eyelids Level Plane (28). The frame (4) outer edge footings (27) define the position of the frame (4) with respect to the Safety Eyelids Level Plane (28) once the user places footings (27) on his/her upper and lower eyelid skin (22, 23). Note that the curvature of the frame (4), is parallel to the curvature of the Safety Eyelids Level Plane (28), as they both have a radius (83) that is similar to that of the curvature of the human cornea (25). The footings' (27) position in conjunction with the curvature of the frame (4), restrict the encroachment of any mechanical elements including the lens (1) past the Safety Eyelids Level Plane (28).

Figure 9:
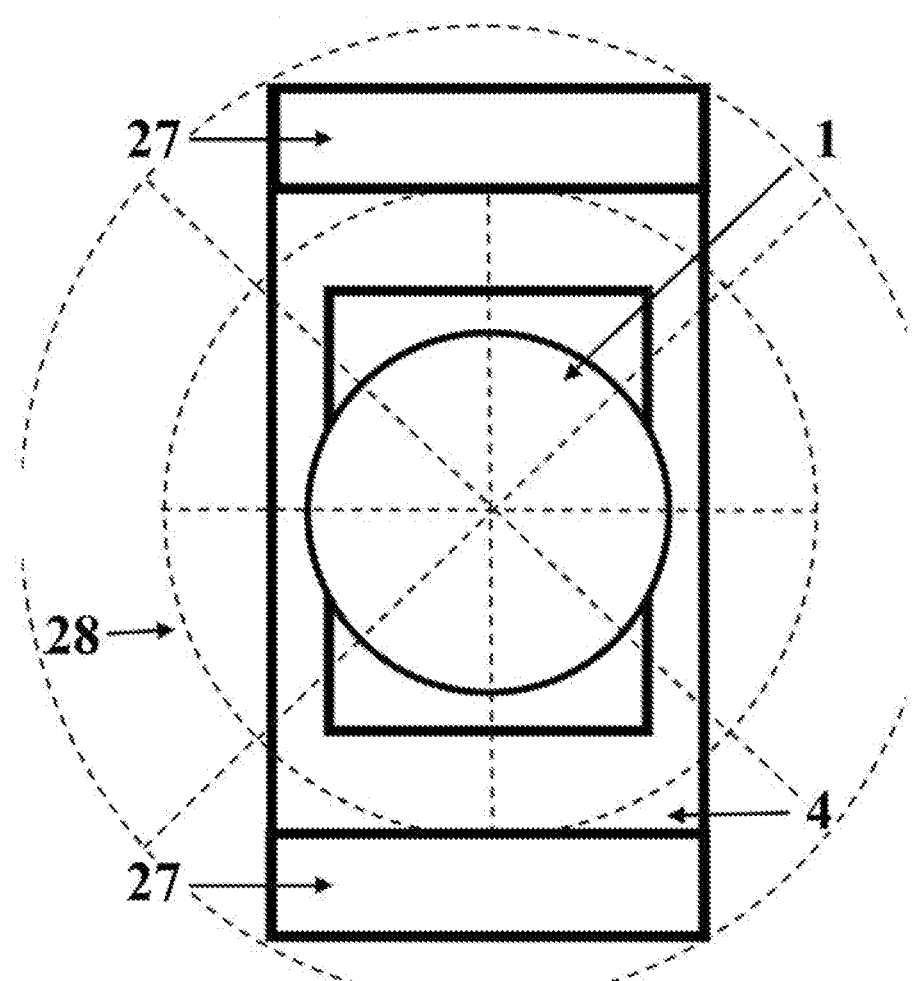

FIG. 9 represents the concave view of the Safety Eyelids Level Plane (28) on the frame (4) as seen by the user during use. When the user places the frame (4) close to the eye (20) (not shown) and places the frame footings (27) on the upper and lower eyelids (22, 23), the user can effectively see through the lens (1) with the knowledge that the frame (4) and the lens (1) attached to it are fixed in a stable and safe position on the upper and lower eyelids (22, 23) and will not breach the Safety Eyelids Level Plane (28) as intended by the invention (100).

Figure 10:
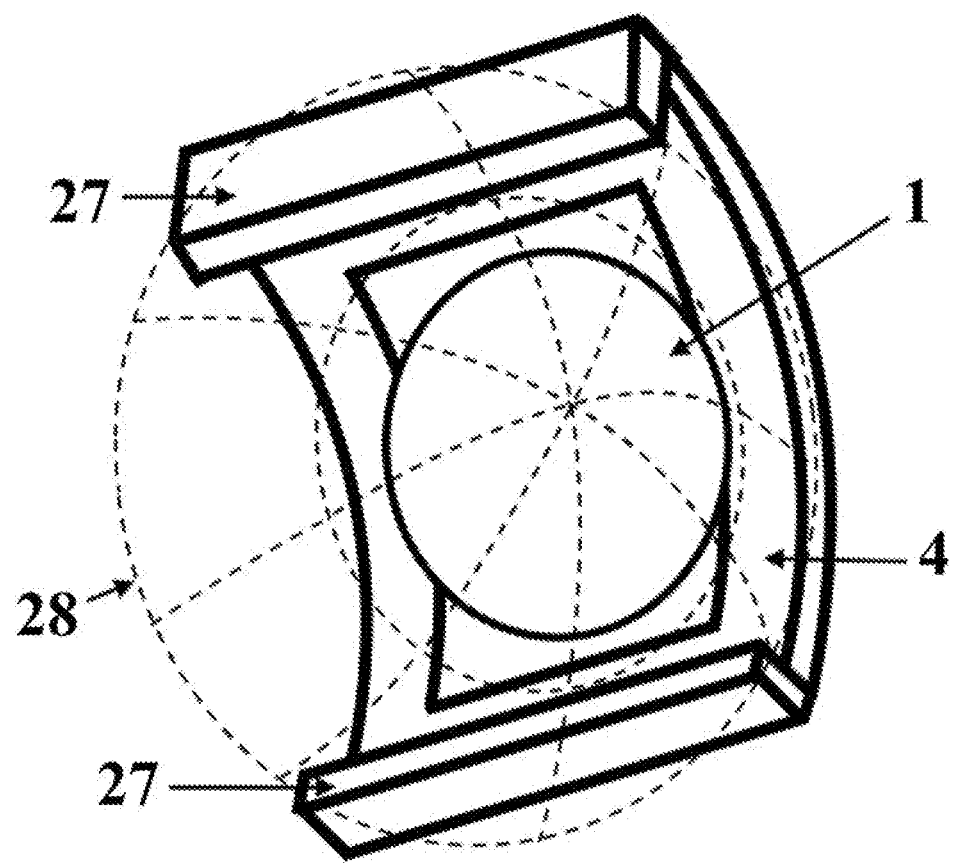

FIG. 10 represents a tilted view of the intended position of the Safety Eyelids Level Plane (28) on the frame (4) during use. In FIG. 10 as was shown in FIG. 9, the leading outer edge footings (27) are placed on the safety plane (28), the Frame (4) and the lens (1) along with the leading edge (27) footings are all behind the Safety Eyelids Level Plane (28).

Referring to FIG. 2B, the frame (4) is shown longer than the diameter of the human cornea (25) as well as the vertical palpebral fissure (30) that represents the distance between the upper and lower eyelid (22, 23) margins. Such requirement allows the proximal (5) and distal (8) edges of the frame (4) to extend safely past the cornea (25) to rest onto the surfaces of the upper and lower eyelids (22, 23). The user can bring the invention (100) close enough to touch the upper eyelid (22) and/or the lower eyelid (23) or neither without risk of touching the eye (20) itself. FIG. 2B demonstrates how the lens (1) that is anchored on the frame (4) can safely be positioned closer to the cornea (25) by placing the outer edge footings (27) of the frame on the upper (22) and lower (23) eyelids. The lens (1) is exposed through the window (10) to the outside world, and the pupil (32) is visible through the transparent lens (1). The footings (27)-frame (4)-lens (1) apparatus (100) is physically separated from the cornea and other vital eye structures by the Safety Eyelids Level Plane (28) defined by the outer skin of the upper (22) and lower (23) eyelids on which the flat ends of the upper footings and lower footings (27) rest. FIG. 2B clearly demonstrates that the lens (1) is significantly smaller than the cornea (25), and emphasizes one of the core intentions of the current invention; a smaller lens (1) to be placed close to the eye (20).

Figure 4A:
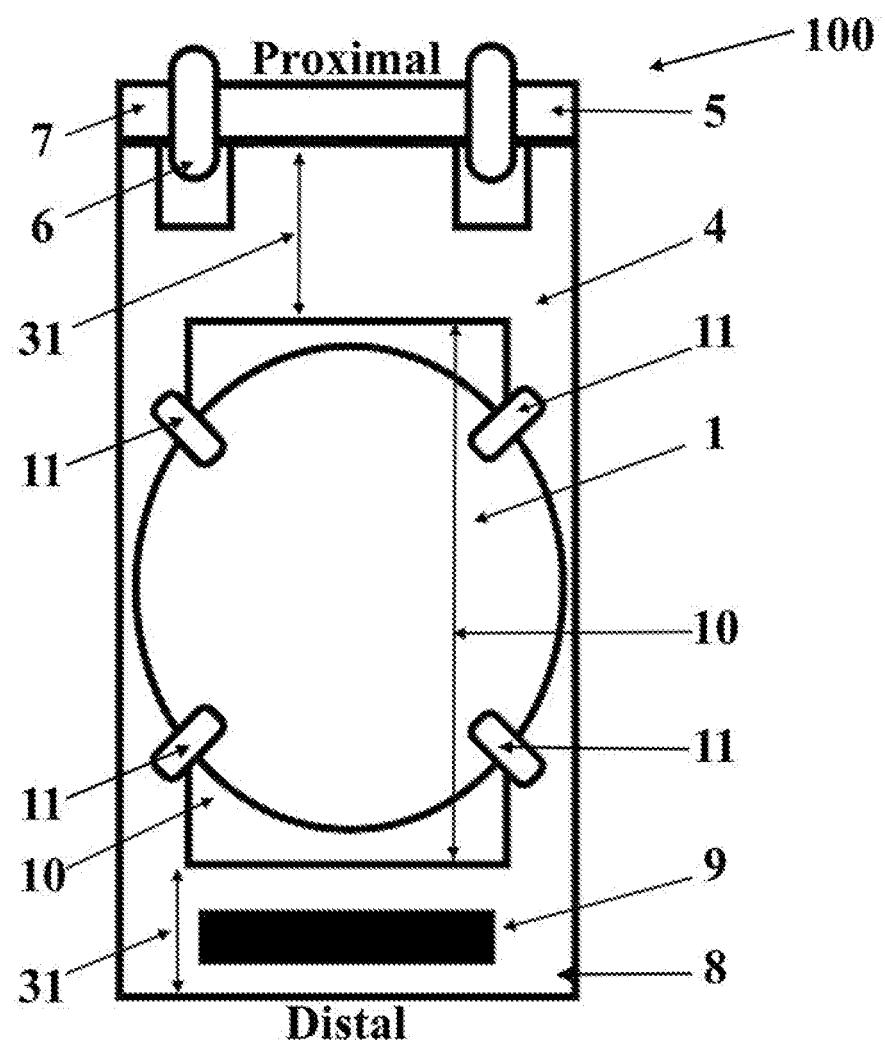

FIG. 4A represents a concave view of the current invention (100). This is the side of the frame (4) that faces the user's eye during use. In the center of the frame there is an open window (10). At the outer edges of the window (10) there are multiple prongs (11) designed to centrally fix the lens (1) to the window (10). The size, location and orientation of the prongs (11) can be manipulated to optimize the stability. The purpose of the window (10) is to allow light rays carrying images of the environment located on one side of the lens to travel to the other side where the eye is supposed to be positioned when the frame is place in front of the cornea (25) (not shown). The small size of the lens (1) as compared to existing art is an essential element of this invention.

Figure 4B:
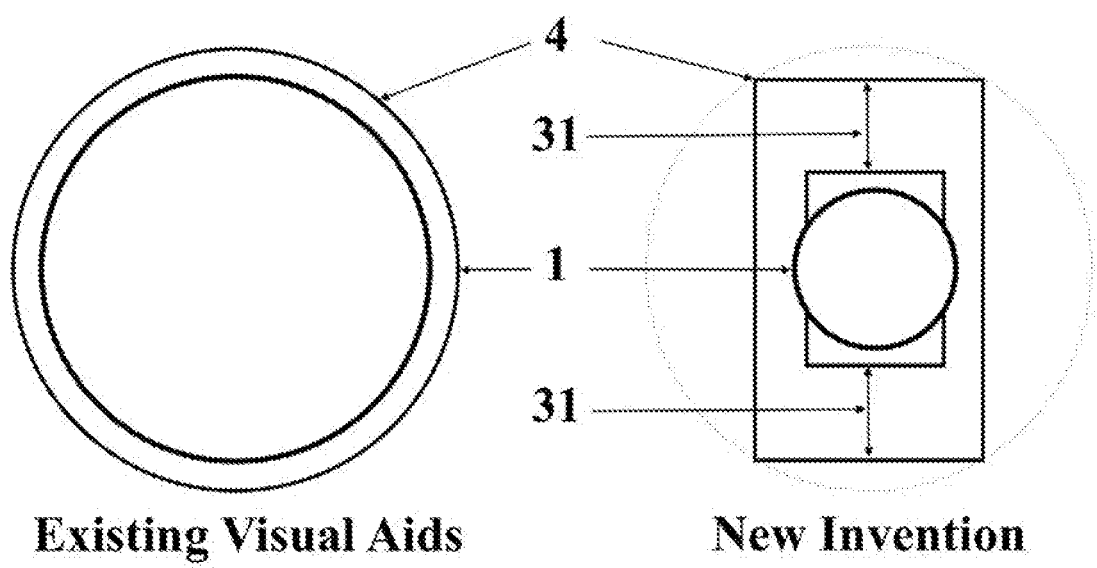

What enables the lens (1) to be smaller are the proximal (5) and distal (8) extensions (31) of the frame (4) unique to the current invention, shown in FIGS. 3, 4 and 4B. The frame extensions (31) allow the window (10) and the lens (1) attached to it to be significantly smaller than the frame (4). Prior art calls for attaching a lens to the inner edge of the frame (FIG. 4B) as opposed to an inner edge of the extensions (31) of the frame (4) that is uniquely called for in this invention (100) (FIG. 4B). No extensions of the frame were needed in prior art because smaller lenses in smaller visual aids were never intended for use.

FIG. 4A also shows a frame (4) with a distal edge (8) that contains locking and unlocking mechanism (9). On the opposite side of the frame (4) there is a proximal end (5) that contains a permanent anchoring mechanism of the frame (4). Depending on the embodiment of the invention (100), the anchoring mechanism can be a simple stick (26) shown in FIG. 1A or a rod (7) that is loosely integrated in two loops (6) on a ring holder also shown in FIG. 12B.

FIG. 7 represents the location of the Safety Eyelids Level Plane (28), the virtual plane past which it is considered unsafe and injurious to encroach upon. FIG. 7 shows the profile sagittal cross-section of the front of the eye (20) and the upper and lower eyelids (22, 23) in the closed position. The virtual Safety Eyelids Level Plane (28) is located on the outer surface of the skin of the upper (22) and lower (23) eyelids. It is of importance to note that this plane (28) is nearly parallel to the outer skin layer of the upper and lower eyelids (22, 23) as well as the outer surface of the cornea (25) behind the upper and lower eyelids (22, 23). The Safety Eyelids Level Plane (28) is the arbitrary safety boundary of the anatomical area of the eye (20) past which the current invention (100) deems by intent and design a no entry zone. Such strict consideration of safety of the present invention (100) during use is not present in prior art. For that reason, all magnifiers and other handheld visual aids in existing use are not designed nor are they intended nor used nor able to be safely used with the intention to bring the device close enough to touch the skin of the user's eyelids as is the case in the current invention (100).

Figure 14A:
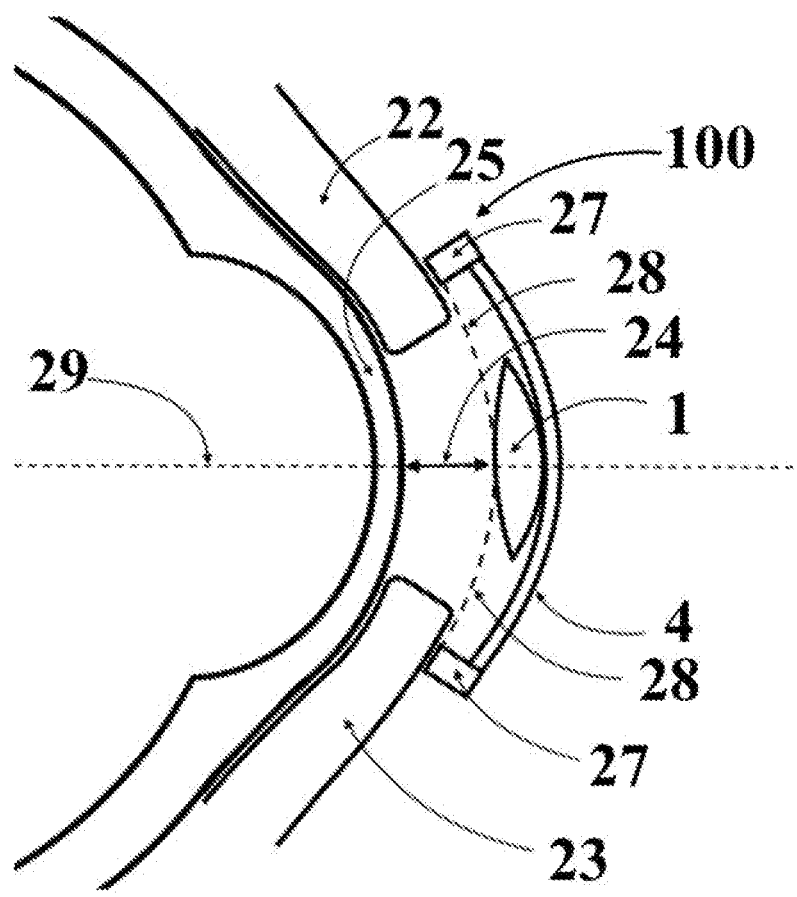

FIG. 14A illustrates how the current invention (100) provides for a safe lens cornea distance (24) during use of the current device (100). As the user centers the lens (1) on the visual axis (29) and rests the frame footings (27) on the user's eyelids (22, 23), the curved nature of the frame (4) keeps the lens (1) away from the cornea (25) keeping it reliably at a safe distance (24). This illustration demonstrates that the virtual Safety Eyelids Level Plane (28) as defined in this presentation is not breached by any of the physical elements of the present invention (100). Resting the lens (1) on the upper (22) and lower (23) eyelids during use provides for predictable and stable lens-eye distance of about 3 mm (24). Such safety design elements are not present in existing art.

Figure 14B:
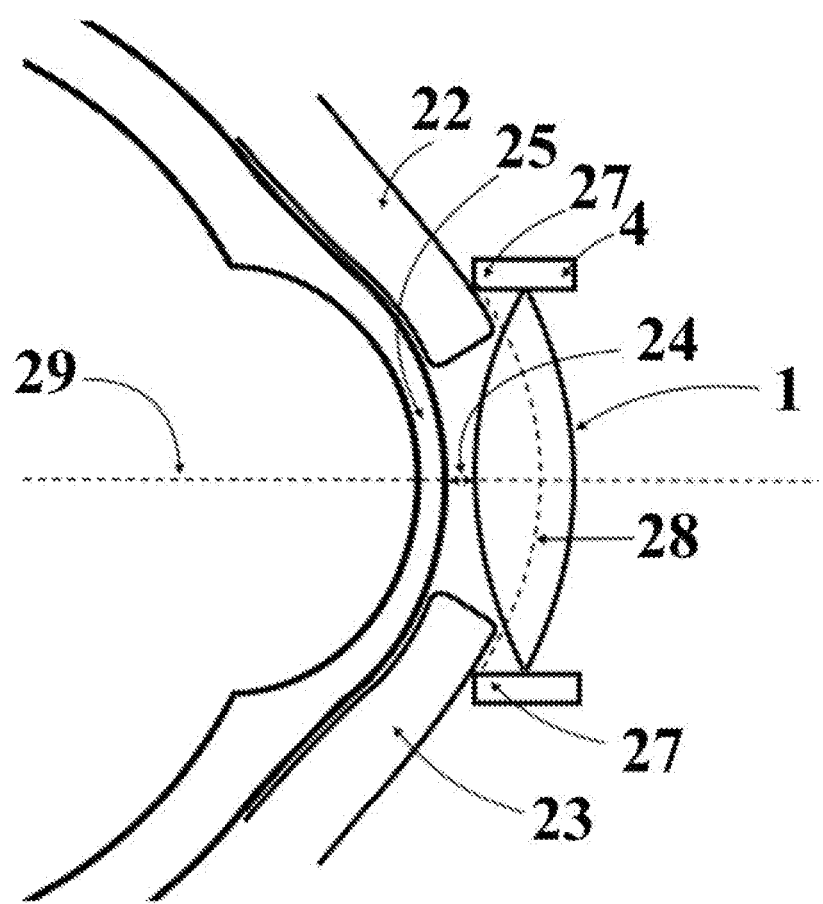

FIG. 14B shows that if the frame (4) of a handheld visual aid in existing use is brought close to the cornea and touch the skin of the upper and lower eyelids (22) and (23), the lens (1) attached to the frame will breach the Safety Eyelid Level Plane (28) defined in this presentation and come close (24) to touching the cornea (25) and present risk of injury to the cornea (25) of the user. When one compares the distance between the lens (1) and the cornea (25) in the current invention (100) as shown in FIG. 14A and that of existing art shown in FIG. 14B, the difference is clear due to lack of frame curvature and the large size of the lens in the existing art.

In FIG. 14B, the magnifier's straight frame (4) pushes the lens (1) closer (24) to the cornea (25) than what would be the case if the frame is curved as shown in FIG. 14A. This existing art does not take into account the risk of the lens (1) touching the cornea (25) when the frame footings (27) are brought into contact with the eyelids (22 and 23). For that reason, the existing art does not call for the frame footings to touch the eyelids; rather it calls for holding the device close but not touching the eye or eyelids. The current invention calls for a small lens on a curved frame (FIG. 14A), while the existing are calls for a large lens on a straight planar frame (FIG. 14B).

Figure 11A:
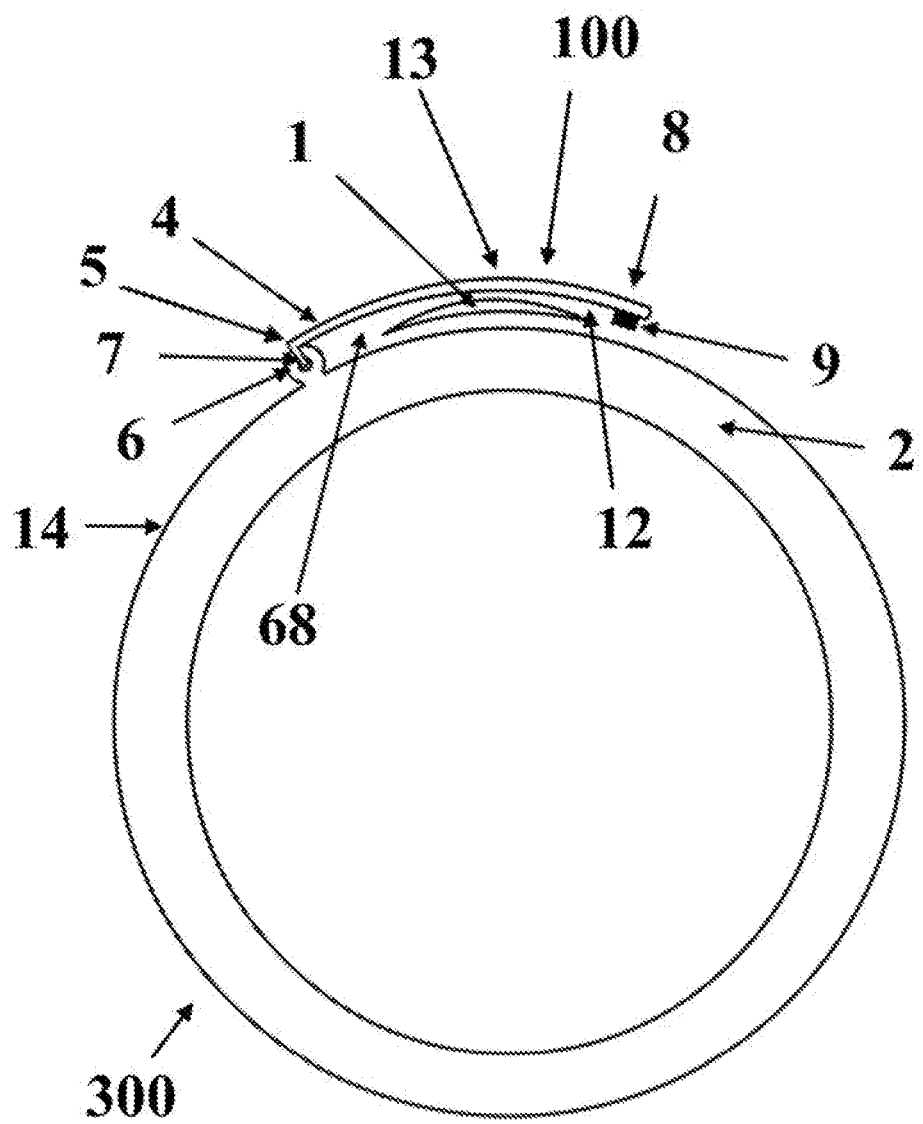

FIG. 11A illustrates another embodiment (300) of the current invention (100) in which the frame (4) can be integrated with a finger ring (2). The advantage of this embodiment over that of a holding stick (26) handle is the ability of the user to easily carry the present invention (100) for extended periods of time. In this particular respect, unlike other hand-held magnifiers and visual aids, the current invention (100) allows the visual aid to be in the same category as eyeglasses, contact lenses and intraocular lenses, where the expectation is that the visual aid is on the user's body at all time without any appreciable effort on the part of the user. The difference here of course is that the (300) embodiment does not place the lens (1) in front of the eye (20) at all time, rather it is on the body at all time. In addition, unlike the existing art of handheld magnifiers where the ability to manipulate the frame is limited in degrees of freedom to the one wrist joint, when the frame is placed on a finger ring there are additional degrees of freedom that become available for more accurate placement of the lens (1) in front of the eye. This is due to the additional number of joints involved in holding a device on the finger.

Referring to FIG. 11A, in this embodiment of the invention (300) while the device is not in use, the frame (4) is in a locked position on the ring (2). In this position the lens (1) that is anchored to the frame (4) is sandwiched between the frame (4) and the ring (2). The view through the lens (1) is blocked by the outer surface of the ring (2). In the locked position, while the concave side (12) of the frame (4) adjoins and conforms to the outer surface of the ring (2), the convex side (13) of the frame, that is on the opposite side of the frame (4) faces the outside world. In this embodiment of the current invention (300), the loops (6) are fixed to the outer edge of the outer surface (14) of the ring (2). The loops (6) act as a fixed anchor through which the frame (4) can be flexibly be connected.

In FIG. 11A there is a gap (68) between the frame (4) and ring (2) that can be manipulated to accommodate differing lenses having different types, powers, shapes and sizes. In addition, the overall shape, design, esthetic appeal of the frame and ring can be artistically manipulated without interfering with the optimal optical performance of the lens.

Continuing with FIG. 11A, features of the design can include magnetic material to further simplify the functionalities and facilitate the use of the device. Specifically, at the distal edge (8) of the frame (4), the locking mechanism of the frame (9) can magnetically connect with the ring (2). Size and strength of such magnetic elements can be manipulated to facilitate the reversible locking and unlocking of the frame (4) to the ring (2) before and after use. The frame (4) can be locked in the closed position using either a mechanical or magnetic mechanism (9).

Continuing in FIG. 11A the frame (4) connects to the ring (2) through the rod (7) and the loops (6). The rod (7) is fixed to the frame (4). The loops (6) are fixed to the ring (2). The rod (7) is loosely and flexibly inserted through both loops (6). In the locked position, the proximal edge (5) the frame (4) is connected to the ring (2) flexibly and irreversibly with the rod (7) which is inserted in the loops (6). On the distal edge (8) the frame (4) has a locking-unlocking mechanism (9) affixed.

Figure 11B:
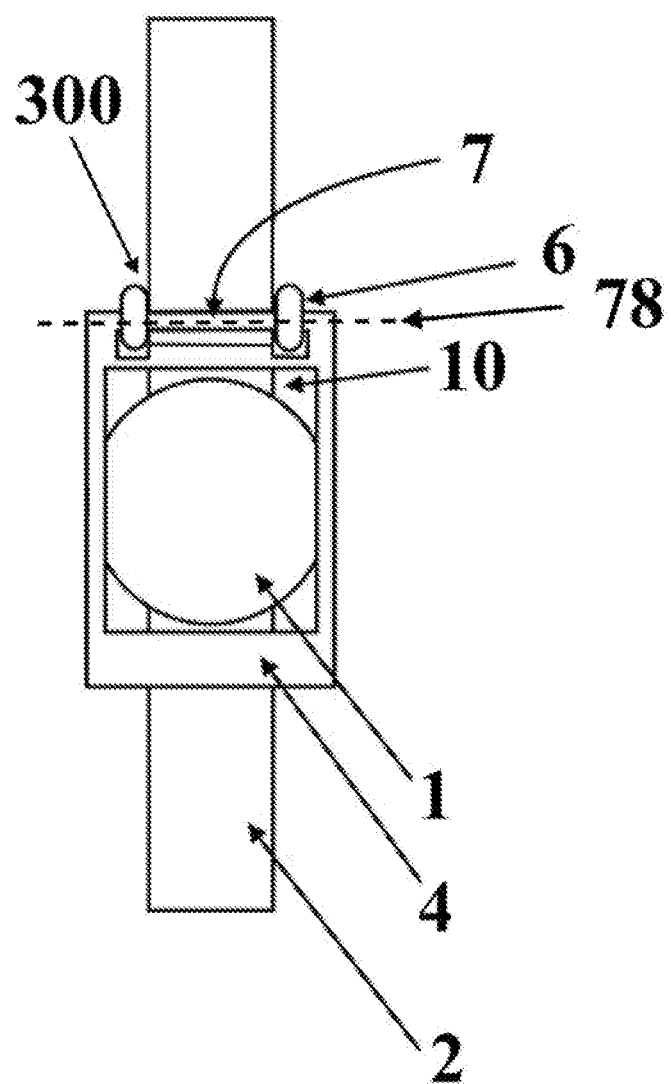

Moving on to FIG. 11B where a top view of the device (100) illustrates the frame (4) on a ring (2) that is in the locked position. In this position the frame (4) with the lens (1) attached, are anchored to the ring (2). The Lens (1) is partially seen through the window (10) that is a permanent opening located in the center of the frame (4). The attachment of the frame (4) to the ring (2) is achieved through the insertion of the rod (7), which is a fixed element of the frame (4) through loops (6) that are fixed to the ring (2). The rod (7) and the loops (6) are flexibly connected together allowing the frame (4) when user wishes to use the lens to be rotated towards the open position without being disconnected from the ring (2) as shown in FIG. 12A.

In FIG. 12A, the frame (4) is rotated open around the axis (78) of the rod (7) which rotates inside the loops (6) that are fixed to the ring (2) into the open unlocked position. Only in the unlocked position can the lens be used as a visual aid. The device (100) can be used only in the unlocked position once the lens (1) is moved away from the outer surface (14) of the ring (2) that blocks the concave side (12) of the frame (4) in the locked position. In the unlocked position, both sides of the lens (1) are exposed to the environment with unblocked transparency. The frame (4) does not block the lens (1) because it has a permanently open window (10) as shown in FIGS. 5 and 12B.

Continuing with 12A and 11B, when the user is done, the frame (4) can be rotated around the axis (78) of the rod (7) that is rotating inside the loops (6), the loops are permanently fixed to the ring (2) and fastened in the locked position. The lens (1) cannot be used in the locked position. Notice that when the frame (4) is unlocked, it forms an angle (21) with the ring (2). This angle (21) can be manipulated to allow the lens (1) which is attached to the frame (4) that is connected to the ring (2) to be placed in close proximity to the cornea (25) in a manner that allows the entire ring (2)-frame (4)-lens (1) apparatus (80) to properly and comfortably conform with the human cornea (25) and its surrounding anatomical support structures as shown in FIG. 2C. The use of such a wide angle (21) is unique to this invention. Handheld devices in current use a right angle (90 degrees) between the ring (2) and the lens (1). Large angles are not needed in prior art because there isn't a necessity to bring the device into close proximity to the eye (20) in the manner required in the current invention (100).

Figure 12B:
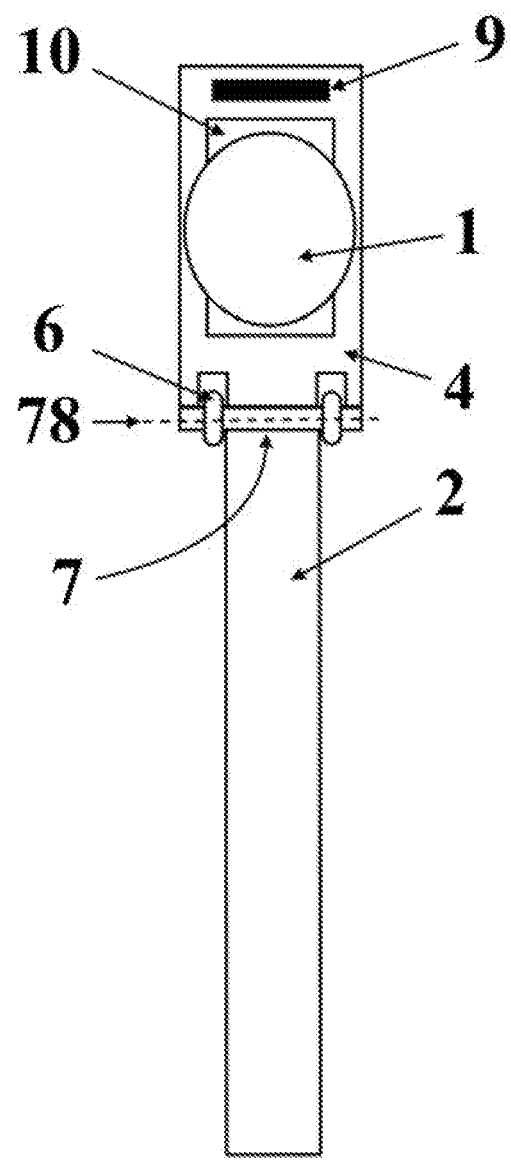

As shown in FIG. 12B, the frame (4) is in the open and unlocked position. This position is achieved by rotating the frame (4) around the (longitudinal) axis (78) of the rod (7) which is a fixed element of the frame (4) that is inserted in the loops (6), where the loops (6) are fixed elements of the ring (2). The lens (1) is now rotated away from the outer surface (14) of the ring (2) and allowed to have both of its sides exposed to the surrounding environment. This exposure is possible because the ring (2) has been rotated out of the way and the frame (4) and has a window (10) that is permanently open allowing light to travel through the lens (1). In this illustration, the locking mechanism (9) is visibly disconnected from the ring (9).

Figure 12C:
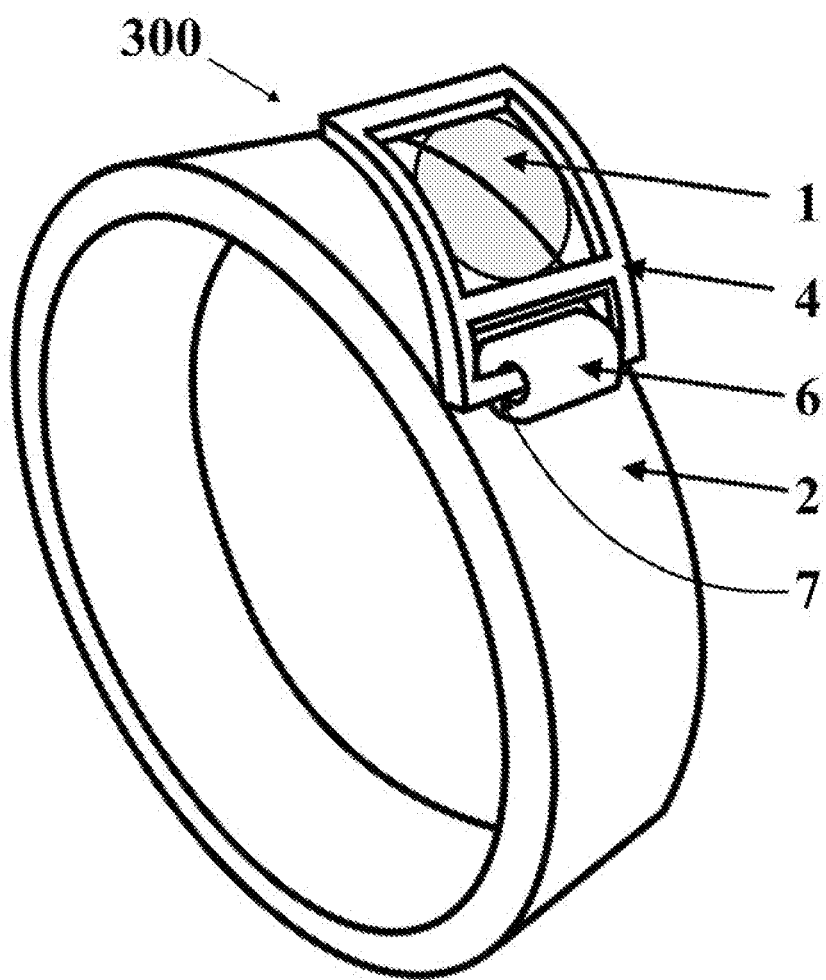

Another embodiment of the invention (100) is illustrated in FIG. 12C. The frame (4) containing the lens (1) and the rod (7) as a permanent element that is flexibly connected to a single loop (6) that is permanently attached to a ring (2). Such loop (6) can be wide and tunnel shaped to add mechanical stability.

FIG. 2C illustrates the ring holder embodiment (300) of the invention during use. Instead of a stick (26), the frame (4) is flexibly anchored to a ring (2). The frame (4) is permanently attached to the ring (2) while the ring (2) is worn on a finger (3) in a locked position (FIG. 11A). In preparation for use the frame (4) is rotated around the rod (7) from the locked to the unlocked position (FIG. 11A). Referring back to FIG. 2C, the ring (4) is then brought close to the upper and lower eyelids (22, 23) resting the ring (2) and the ring loops (6) on the lower eyelid (23) positioning the lens (1) in alignment with the center of the cornea (25). Here, the loops (6) not only permanently anchor the frame (4) to the ring (2), they also act as footings to stabilize the frame (4) on the lower eyelid (23). In this embodiment of the invention (300), the ring (2) is also used as a footing. The proximal edge (8) footing (27) rests on the skin of the upper eyelid (22) to further safely stabilize the frame (4) and lens (1) in front of the cornea (25). All this positioning can be safely done without breaching the Safety Eyelid Level Plane (28). In this embodiment of the invention (300) where a finger ring (2) is used as a handle, both ring (2) and loops (6) act as footings to stabilize the frame (4) on the eyelid (23) and avoid breaching the safety barrier of the Safety Eyelid Level Plane (28). This illustration demonstrates that during use of this embodiment of the invention (300), the Safety Eyelids Level Plane (28) is not breached by any physical element of the ring-frame-lens apparatus (80).

FIG. 2C further illustrates the feasibility of using a finger ring (2) as a holder onto which the frame (4) of a lens (1) can be folded and reopened for use on the eye (20). That feasibility, however, is predicated upon the condition that all 4 curved elements involved in this invention have similar radii of curvature; these elements are the human cornea (25), the Safety Eyelid Level Plane (28), the frame (4) and the ring (2).

Table 1 shows published empirical knowledge of the radii of curvature for the human cornea (25) and that of rings (2) in common use.

TABLE 1

| RADII OF CURVATURE | | | |
|---|---|---|---|
| CORNEA CENTRAL | RC | 7.77 ± 0.2 MM | REFERENCE 1 |
| EYEBALL | RE | 12.13 ± 0.5 MM | REFERENCE 3 |
| CORNEA PERIPHERAL | RP | 9.29 MM ± 0.4 MM | REFERENCE 1 |
| SAFETY EYELID LEVEL PLANE | RS | 9.29 MM | EQUAL TO RP BY ANATOMICAL LOCATION |
| RING | RR | 9.80 ± 2.5 MM | REFERENCE 2 |
| FRAME | RF | 9.98 MM | EQUAL TO RR BY DESIGN |

A critical feature and intent in this design of the current invention (100) is the conformity of the frame (4) with the Safety Eyelid Level Plane (28). Specifically, for safety purposes the objective is for the frame (4) and the Safety Eyelid Level Plane (28) to be parallel or near parallel with preference toward the frame (4) to be slightly flatter than the Safety Eyelid Level Plane (28).

In addition, the proposed design calls for exact fitting of the frame (4) on the ring (2) in the locked position (FIG. 11A). The proposed radius of curvature of the frame (Rf) must be equal to that of the radius of the rings (Rr) in existing use, otherwise they cannot fit together as required by the design.

Therefore, by design requirement: Rr=Rf

The radius of curvature of the Safety Eyelid Level Plane (28) (Rs) is equal to that of the peripheral human cornea (25) (Re). This is the case because, by definition the Safety Eyelid Level Plane (28) is formed by the outer surface of the upper and lower eyelids (22, 23), where the frame footings (27) are to be placed (FIG. 2C). Due to the soft tissue nature of the upper and lower eyelids (22, 23), and the fact that the upper and lower eyelids (22, 23) rest on the human cornea (25) in the open and closed position, the Safety Eyelid Level Plane (28) naturally conforms to the curvature of the cornea (25).

Therefore, by anatomical fact: Rc=Rs

Since the intention of the current invention (100) is to place a frame (4) with a curvature that is similar the curvature of the Safety Eyelid Level Plane (28), the radius of curvature of the frame (4) (Rf) must be close to the radius of curvature of the Safety Eyelid Level Plane (28) (Rs). Otherwise the claim will have no foundation.

Therefore, the requirement is: Rf≈Rs

According to Table 1: Rr≈Rc

Since, as stated above: Rr=Rf and Rc=Rs

Therefore: Rf≈Rs

Since the human eye (20) and the human fingers (3) are both circular and of similar circumferences, that makes the assertion of Rf≈Rs not an unusual coincidence. Simply put, the frame (4) with enough curvature as described and claimed in the current invention (100) that can fit on a person's finger ring (2), can also fit on the outer skin layer of the upper and lower eyelids (28).

The established empirical evidence laid out in Table 1 supports that claim. According to data in Table 1 and referring to FIG. 1B, the average radius of curvature of the ring used by humans (9.80 mm) (84) is just slightly flatter than the average radius of curvature of the human central cornea (7.77 mm) (85), and even closer in radius of curvature of the peripheral cornea (9.29 mm) (81). In fact, the Safety Eyelid Level Plane (82) rests on the peripheral cornea (82), and not on the central cornea (85) in the open eye position; that is the position taken during use of the ring (2)-frame (4)-lens (1) apparatus (80), making the conformity even more exact.

A frame (4) on a ring (2) can be either in a locked (FIGS. 11A and 11B) or unlocked position (FIGS. 12A and 12B). A unique design of this invention (100) is that when in the locked position, the frame (4) (FIG. 11A) is curved in a way that matches the curve of the ring (2) (FIG. 11A). As such it becomes discrete while not in use. A locked stable frame (4) is critical for maximum enjoyment of use of the ring (2) as a stable jewelry item during the long periods between uses of the device.

The way the frame (4) (FIGS. 4, 5, 11B) connects to the ring (2) (FIGS. 4, 5, 11B) is through the rod (7) (FIGS. 4, 5, 11B) and the loops (6) (FIGS. 4, 5, 11B). The rod (7) (FIGS. 4, 5, 11B) is a feature that is fixed to the frame (4) (FIGS. 4 and 11B). The loops (6) (FIGS. 4, 5, 11B) are features that are fixed to the ring (2) (FIGS. 4, 5, 11B). The rod (7) is loosely and flexibly inserted in both loops (6) (FIGS. 4, 5, 11B). In the locked position, the proximal edge of the frame (5) (FIG. 11A) is locked to the ring (2) irreversibly with the rod (7) inserted in the loops (6). On the distal edge (8) (FIG. 11A) the frame (4) is reversibly locked with a locking-unlocking mechanism (9).

The frame (4) (FIG. 12A) can be twisted open and allowed to rotate around the axis of the rod (7) (FIG. 12A) that is rotating inside the loops (6) (FIG. 12A) that are fixed to the ring (2) (FIG. 12A). The lens (1) is used for visual aid purposes only in the unlocked position. When the user is done, the frame (4) (FIG. 12A) can be twisted around the axis of the rod (7) (FIG. 12A) that is rotating inside the loops (6) (FIG. 12A) that are fixed to the ring (2) (FIG. 12A) and allowed back into locked position. The lens (1) cannot be used in the locked position.

Another unique aspect of this embodiment of the invention (100) is that the frame (4) (FIG. 2C) is small enough and shaped in a way that the ring (2) (FIG. 2C) can be brought close to the eye (20), resting on the lower eyelid (23) (FIG. 2C) placing the center the lens (70) (FIG. 2C) close to the center of the cornea (25) (FIG. 2C) without breaching the Safety Eyelid Level Plane (28) (FIG. 2C).

The small size of the lens (1) as compared to existing art is an essential element of this invention (100). What enables the lens (1) to be smaller are the extensions (31) of the frame (4) unique to the current invention (100) (FIGS. 4, 3) making the window (10) significantly smaller than the frame (4) (FIGS. 4, 3). Prior art use calls for attaching the lens to the inner edge of the outer rim of the frame as opposed to the inner edge of the upper and lower extensions (31) (FIG. 4) of the frame (4) as is shown in the present invention (100). No extensions (31) were needed in prior art because smaller lenses in smaller visual aids as defined in the present invention (100) were not intended in the prior art.

In this embodiment of the invention (300) where a finger ring (2) is used as a handle instead of a stick (26), the loops (6) (FIG. 2C) that are fixed to the ring (2), along with the ring (2) itself (FIG. 2C), act as footings (27) to stabilize the frame (4) (FIG. 2C) on the lower eyelid (23) (FIG. 2C) to avoid breaching the safety barrier of the Safety Eyelid Level Plane (28) (FIG. 2C).

In this embodiment of the invention (300), in the closed position, the lens (1) (FIG. 11A) is sandwiched between the frame (4) (FIG. 11A) and the ring (2) (FIG. 11A). The lens (1) is exposed to the outside world from one side in the closed position (FIG. 11B) through the window (10) (FIG. 11B) and from both sides in the unlocked position (FIG. 12A). When both sides are exposed in the unlocked position, the frame footings (27) can be placed on the upper and lower eyelids (FIG. 2C, 2C) to center the lens (1) (FIG. 2C) in front of the center of the cornea (25) (FIG. 2C).

It is called for in the current invention (100) that the curvature of the frame (4) (FIG. 2C) matches the curvature of the ring (2) (FIG. 2C) should conform with it in the locked position (FIGS. 11A, 11A). Such a curved frame (4), when in the open position (FIGS. 12A, 2C), becomes parallel and conformant with the curvature of the human cornea (25) (FIG. 2C).

The attachment of the frame (4) (FIG. 2A) to a ring (2) to be worn on a finger (3) is possible because the curvature of a finger ring (2) is slightly flatter than the human cornea (25) (See Table 1). The average radius of the inner ring worn on a human finger is 9.80 mm. The average central cornea radius is 7.77 mm and that of the peripheral cornea is 9.29 mm. The frame (4) (FIG. 2A) that is subject to this invention (100) is expected to have the exact curvature of the ring (2) (FIG. 2A) but is preferred to be flatter than the curvature of the human cornea (25) (FIG. 2A) for reasons stated above; Longer, Flatter, softer edges and more visible by user. Therefore, the curvature design of the frame (4) presented in this invention (100), when matched to fit in a finger ring (2) is plausible because the human finger ring (2) is slightly flatter than the human cornea (25).

What is also unique to this current invention (100) is the ability to seamlessly integrate a functionally useful magnifier with a ring without interruption of the ability of the user to wear and enjoy the elegance of the ring as a jewelry item.

The frame (4) has a concave side (12) (FIGS. 4, 6) and a convex side (13) (FIGS. 5, 6). Once the frame (4) is closed and locked on to the ring (2) (FIG. 11A), the concave side (12) adjoins and fits with the outer surface of the ring (4), and the convex side (13) is on the opposing side of the frame (4) away from the outer surface of the ring (4) facing the outside world.

In this embodiment of the current invention (300), the loops (6) are connected to the outer edge of the outer surface of the ring (14) (FIG. 11A). The prongs (11) can be placed in a variety of ways based on design and functional preferences (FIG. 4A). Aside from prongs (11), the lens (1) can be anchored and stabilized by variety means and methods available in existing jewelry art.

Figure 15A:
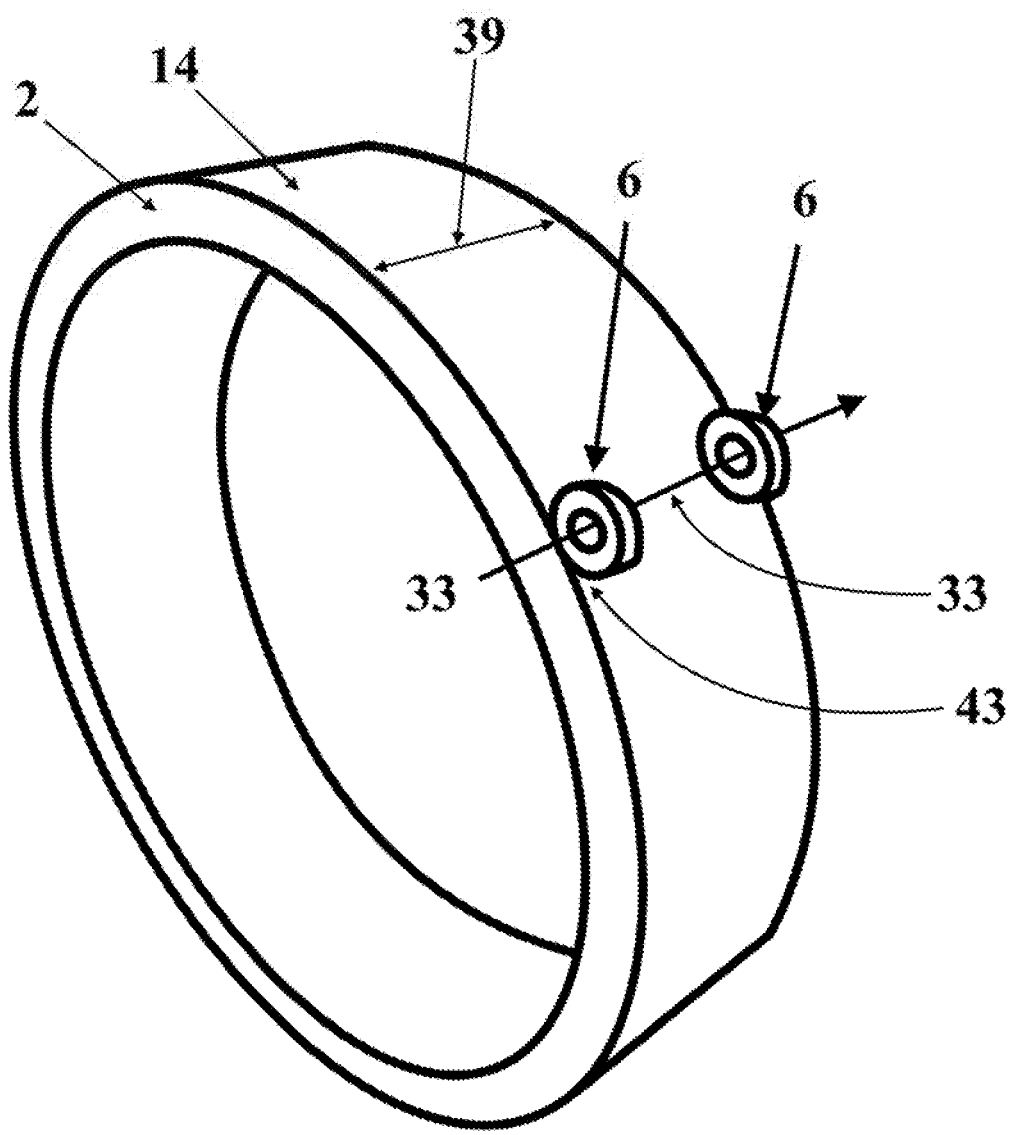
Figure 15B:
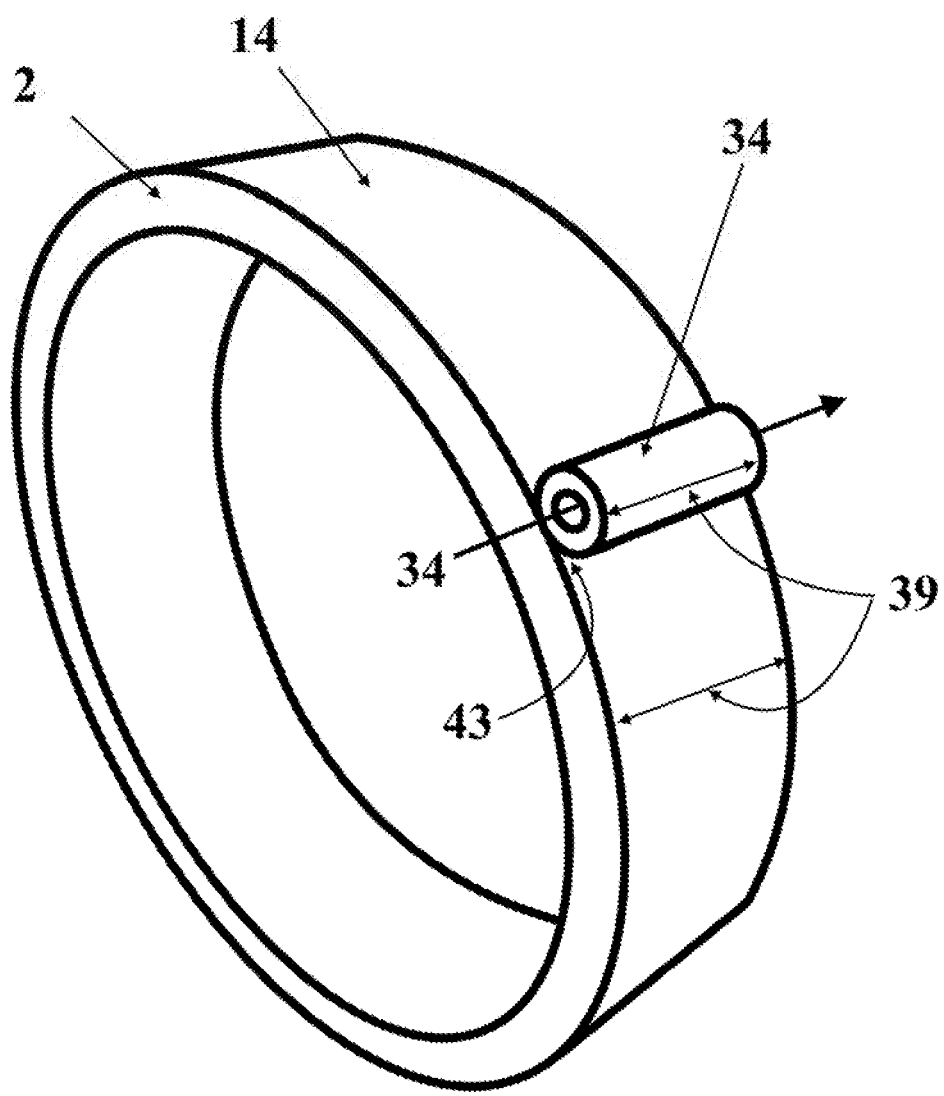
Figure 15C:
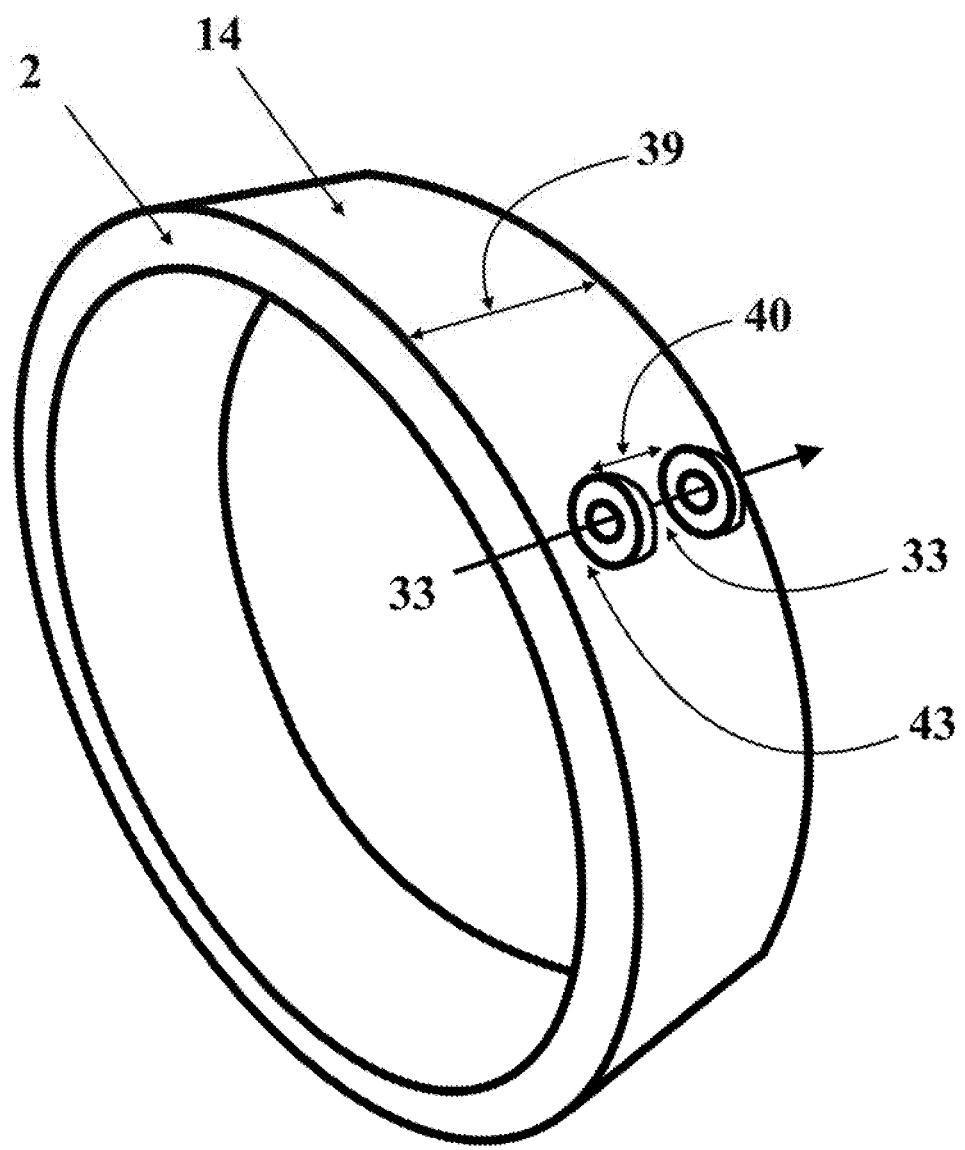
Figure 15D:
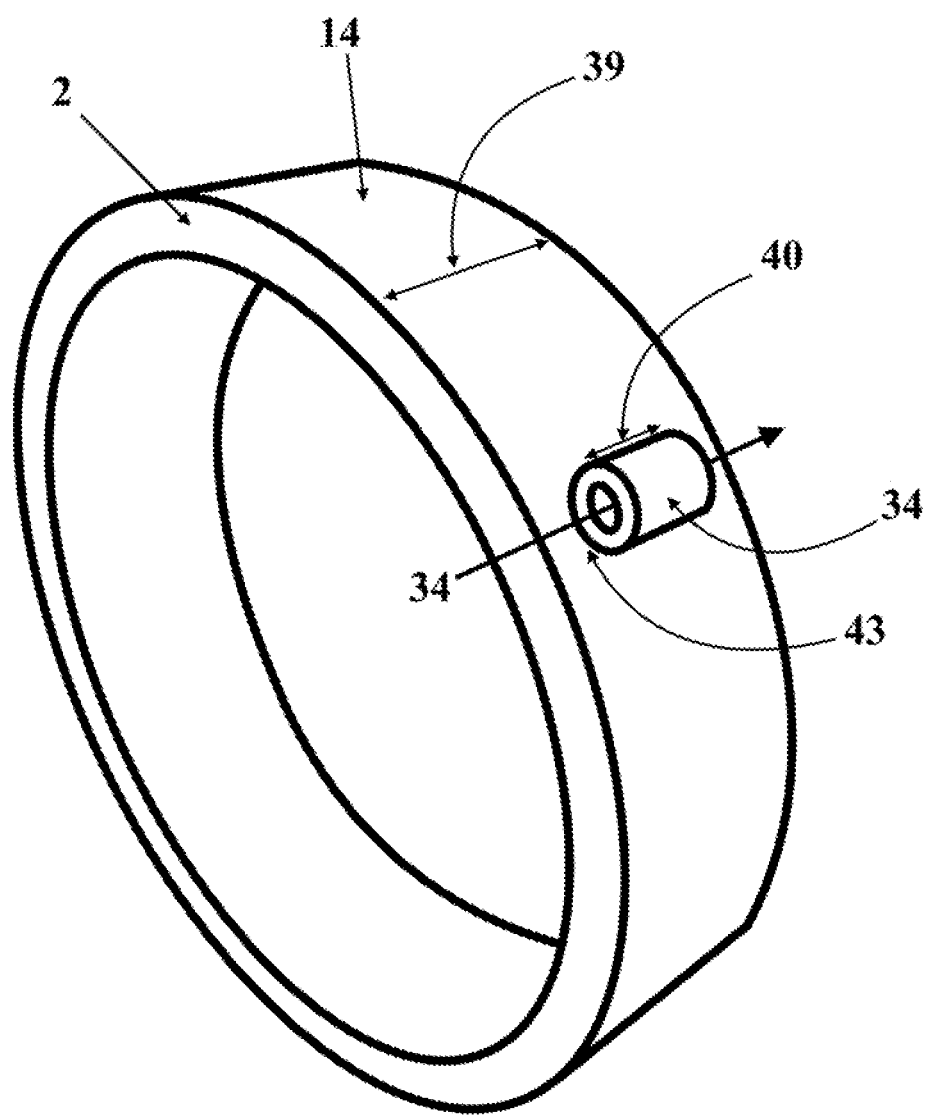
Figure 15E:
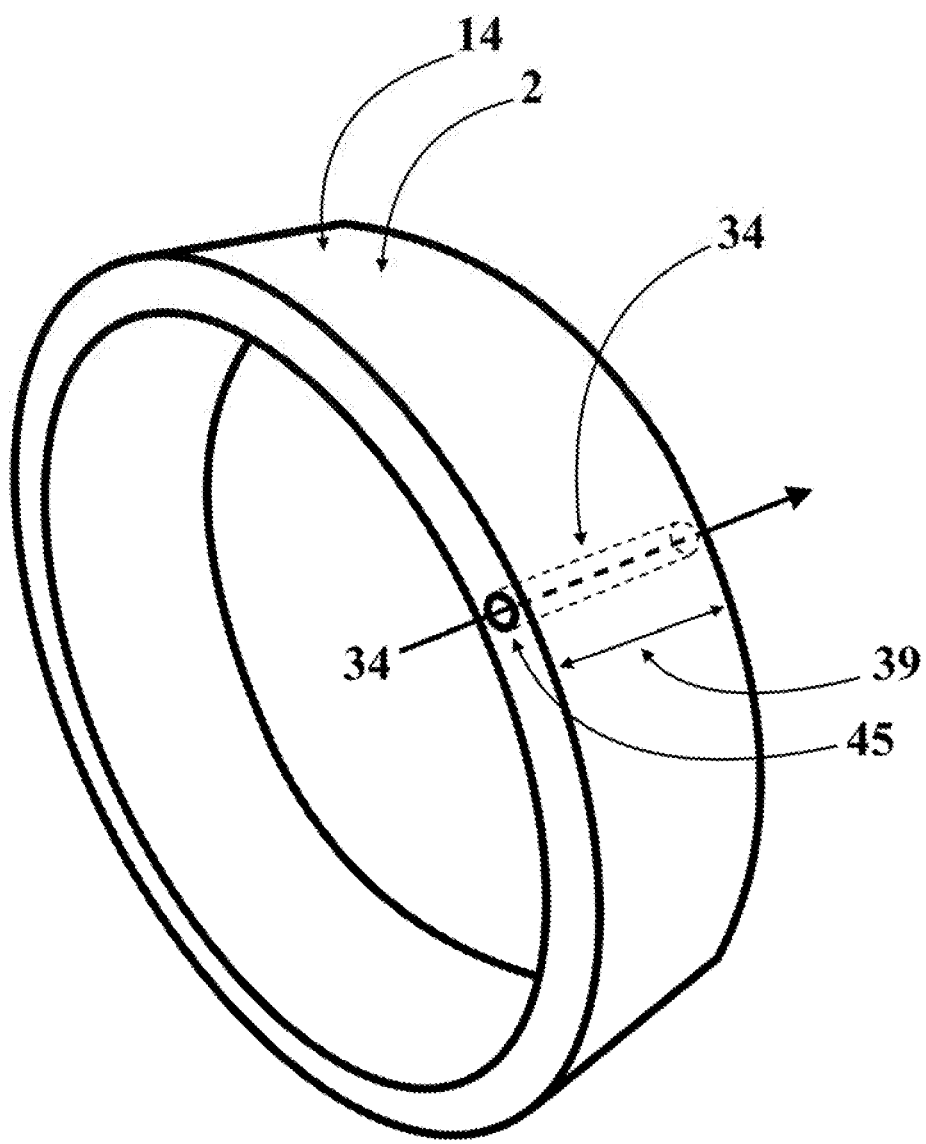
Figure 15F:
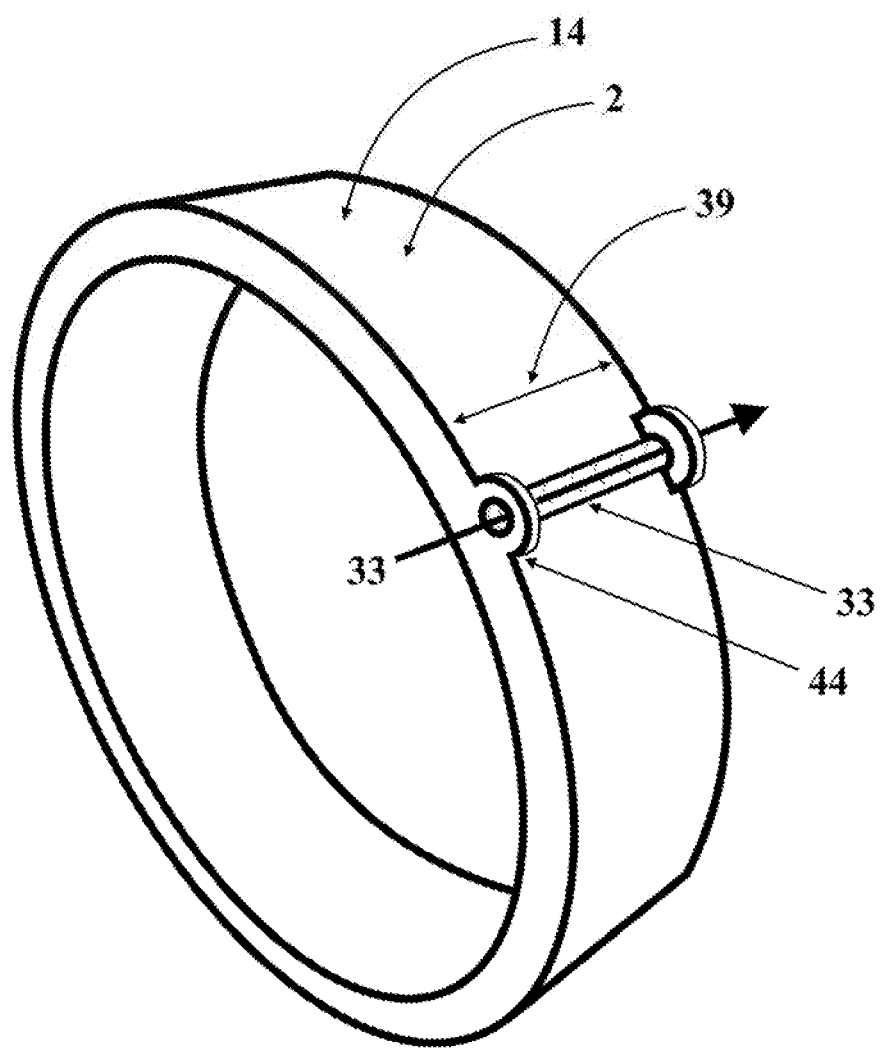
Figure 15G:
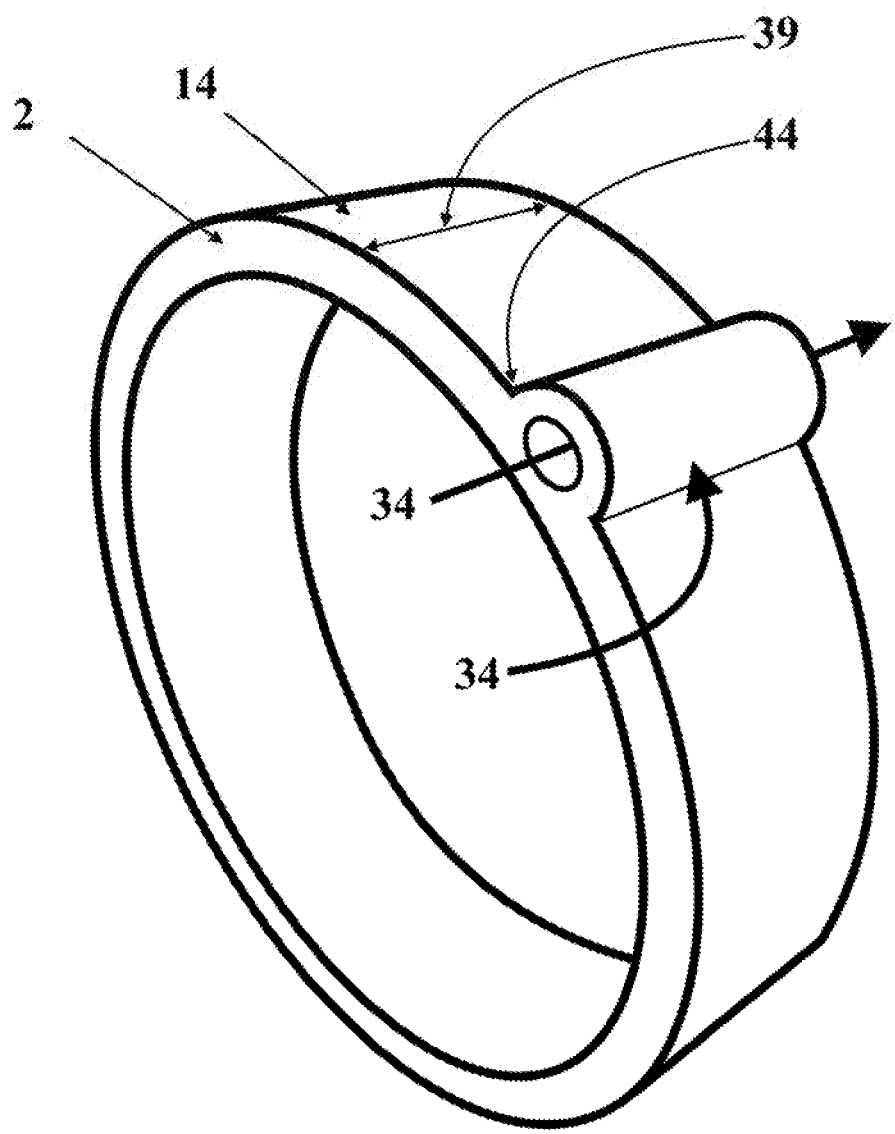
Figure 15H:
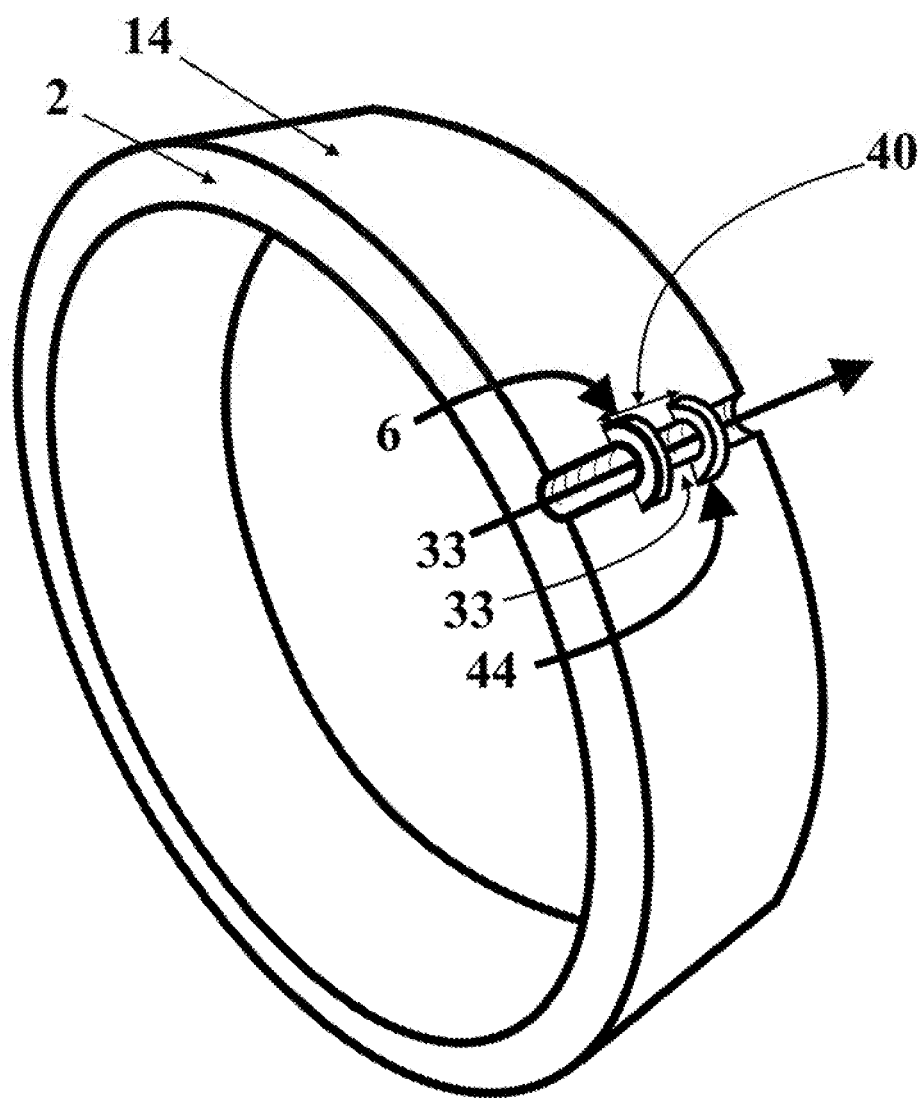
Figure 15I:
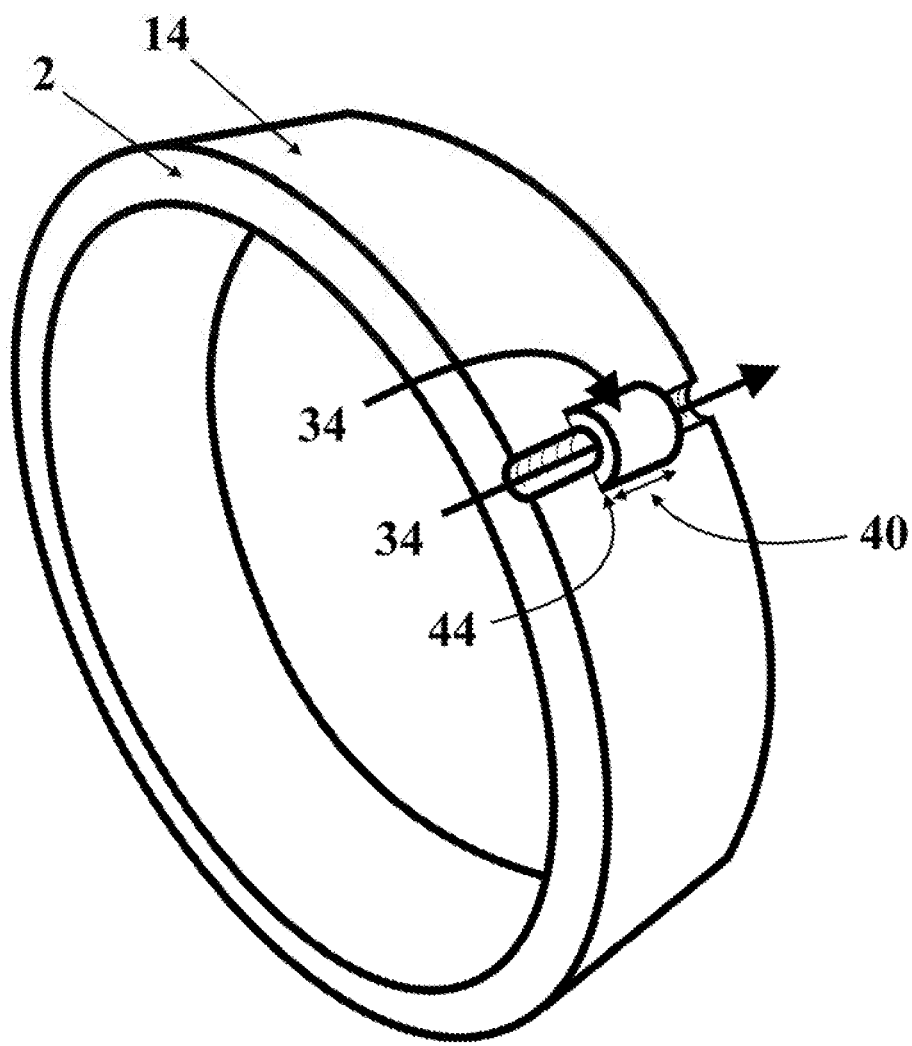

The loops and tunneling system described in this embodiment of the invention can be accomplished in a variety of ways. For example, the tunnel system can occupy the entire width of the band (39) of the ring (2) as demonstrated in FIGS. 15A, 15B, 15E 15F and 15G (See Table 2). This differs from FIGS. 15C, 15D, 15H and 15I where the tunnel occupies a portion of the band width (40) of the ring (2). In addition, the variation includes whether the tunnel is open (33) as in FIGS. 15A, 15C, 15F and 15H where loops (6) define the outer edges of the tunnel (33). This differs from FIGS. 15B, 15D, 15E, 15G and 15I where the tunnel (34) system is covered. Finally, the tunnel system can be fully elevated (43) off the outer surface of the ring (14) as in FIGS. 15A, 15B, 15C and 15D, partially elevated (44) as in FIGS. 15F, 15G, 15H and 15I, or not elevated at all, it is rather completely buried (45) inside the ring (2) as in FIG. 15E. The elements that all the variations of the loop-tunneling system described in this invention have in common are the tunnels (33, 34) and the connection to the ring (2).

TABLE 2

TYPES OF TUNNELS

| FIGS. | FULL/PARTIAL | OPEN/CLOSED | ELEVATED/BURRIED |
|---|---|---|---|
| 15A | FULL | OPEN | ELEVATED |
| 15B | FULL | CLOSED | ELEVATED |
| 15C | PARTIAL | OPEN | ELEVATED |
| 15D | PARTIAL | CLOSED | ELEVATED |
| 15E | FULL | CLOSED | BURRIED |
| 15F | FULL | OPEN | PARTIALLY ELEVATED |
| 15G | FULL | CLOSED | PARTIALLY ELEVATED |
| 15H | PARTIAL | OPEN | PARTIALLY ELEVATED |
| 15I | PARTIAL | CLOSED | PARTIALLY ELEVATED |

The gap (68) between the frame (4) and ring (2) (FIG. 11A) can be manipulated to accommodate for lenses of different types, powers, shapes and sizes. In addition, the overall shape, design, esthetic appeal of the frame and ring can be artistically manipulated without interfering with the optimal optical performance of the lens.

In this embodiment of the current invention (300) the frame (4) (FIG. 2B) is longer than the opening of the upper and lower eyelids (22, 23), which is known as the vertical palpebral fissure (30) (FIG. 2B). Such a requirement allows for the edges of the frame (52) to extend safely past the cornea (25) and the eyelids' margins to rest onto the surfaces of the upper and lower eyelids (22, 23) (FIG. 2B). The user can bring the frame-lens complex close enough to touch the upper eyelid (22) and/or the lower eyelid (23) or neither. In none of these options will the frame (4) or lens (1) will touch the vital elements of the eye (20) such as the cornea (25) (FIG. 2B).

In this embodiment of the current invention (100), some features of the design can be made with magnetic material to further simplify the functionalities and facilitate the use of the device. Specifically, at the outer edge of the frame (72), the locking mechanism (9) of the frame (4) (FIG. 11A) can magnetically connect with the ring (2). Size and strength of such magnetic elements can be manipulated to facilitate the reversible locking and unlocking of the frame to the ring (2) before and after use. The frame (4) (FIG. 11A) can be locked in the closed position using either a mechanical or magnetic mechanism (FIG. 11A).

Although the foregoing invention has been described in some detail for purposes of clarity of understanding, it will be apparent that certain changes and modifications may be practiced within the scope of the invention. Accordingly, the present embodiments are to be considered as illustrative and not restrictive, and the invention is not to be limited to the details given herein, but may be modified within scope and equivalents of the invention.

What is claimed is:

1. A magnifier for use braced against a human head, said magnifier comprising:
   a. a hinge means functioning to secure a frame, said frame having a window centrally located therein;
   b. said frame having a proximal and a distal extension defined thereon;
   c. a lens, said lens being smaller than the human cornea, said lens being secured to an upper and a lower extension on said frame;
   d. said hinge means having at least one stationary loop and a pivoting axle therein;
   e. said pivoting axle having a connection to the frame;
   f. said stationary loop designed to act as a footing and abut the superior orbital rim of a user;
   g. said stationary loop is secured to a user's ring;
   h. wherein the user can position said frame in a closed position against the ring and a functional position; and
   i. wherein the user can open the frame to the functional position and place the stationary loop against the user's superior orbital rim, or lower eyelid thereby positioning the lens a distance from the cornea ranging from 2.5 mm to about 3.5 mm (0.098 inch to 0.138 inch).

2. A magnifier for use braced against a human head, said magnifier comprising:
   a. a frame, said frame being arcuate shaped and having a window defined therein, said window being smaller than the cornea of a human eye;
   b. a lens, said lens being fixed to said frame on a side of said frame;
   c. said frame having a proximal edge and a distal edge;
   d. said frame having an upper extension located on a proximal edge and a lower extension located on a distal edge;
   e. said frame having a hinge means consisting of a pivoting axle connected to said proximal edge of said frame;
   f. said pivoting axle is rotatably connected to at least one stationary loop;
   g. said stationary loop being secured to a user's ring;
   h. the user's upper and lower eyelid define a safety eyelid level plane, or safety boundary;
   i. said safety boundary being at least 2.5 mm to 3 mm (0.098 inch to 0.118 inch) from the user's cornea;
   j. said axle and stationary loop collectively defining an upper footing, said upper footing being positioned on said proximal edge of said frame, said distal edge defining a lower footing;
   k. wherein the user can close the frame against the ring, said lens being positioned between an outer surface of said ring and said a concave side of said frame; and
   l. wherein the user can pivotably open said frame to the functional position and place the lower footing on said distal edge against the user's upper eyelid and said upper footing on said proximal edge on said lower eyelid thereby placing the lens a safe distance from the user's cornea of at least 3 mm (0.118 inches).

3. The magnifier as described in claim 2, wherein said hinge means consists of 2 loops, said loops being fixed to an outer surface of said ring and being spaced apart;
   a. said pivoting axle being fixed to said frame on said proximal edge and being rotatably connected to said loops located at said users ring allowing said frame to rotate from a closed position to an open position.

4. The magnifier as described in claim 2, further comprising:
   a. a locking means, said locking means being located on said distal edge of said frame; and
   b. said locking means is a magnet, said magnet securing said concave side of said frame in close proximity to said outer surface of said ring.

5. A magnifier for use braced against a human head, said magnifier comprising:
   a. a frame, said frame being arcuate shaped and having a window defined therein, said window being smaller than the cornea of a human eye;
   b. said frame having an proximal extension and a distal extension;
   c. a lens, said lens being fixed to said frame on a concave side of said frame, said lens further being smaller in size than the human cornea;

d. said frame having a proximal edge and a distal edge, said proximal extension being located on said proximal edge and said distal extension being located on said distal edge;
e. a hinge means functioning to secure said lens and said frame in a closed and functional position;
f. the upper and lower eyelid of the user define a safety eyelid level plane, or safety boundary, said safety boundary defining a radius, said radius being defined by the upper and lower eyelid of a user;
g. said safety boundary being at least 3 mm (0.118 inches) from the user's cornea;
h. a proximal footing, said proximal footing is positioned on said proximal edge of said frame;
i. wherein the user can close the frame against a ring, said lens being positioned between an outer surface of said ring and said concave side of said frame; and
j. wherein the user can pivotably open said frame to the functional position and place the proximal footing against the user's upper eyelid and said distal end on said lower eyelid thereby placing the lens a distance from the user's cornea of at least 3 mm (0.118 inches).

6. The magnifier as described in claim 5, wherein said arcuate shape of said frame is a radius, said radius matching the radius of said safety boundary when the eyelids are in an open position.

7. The magnifier as described in claim 5, wherein said hinge means consists of one centrally located loop;
a. said loop being centrally fixed to an outer surface of said ring;
b. a pivoting axle being fixed to said frame on said proximal edge and being rotatably connected to said loop located at said users ring allowing said frame to rotate from a closed position to an open position; and
c. said pivoting axle and said loop further defining said upper footing.

8. The magnifier as described in claim 5, wherein said hinge means consists of two loops, said loops being spaced apart and being located on said outer surface of said ring; and
a. a pivoting axle being fixed to said frame on said proximal edge and being rotatably connected to said loops located on said ring allowing said frame to rotate from a closed position to an open position.

9. The magnifier as described in claim 5, further comprising:
a. a locking means, said locking means being located on said distal edge of said frame; and
b. said locking means is a magnet, said magnet securing said concave side of said frame in close proximity to said outer surface of said ring.

10. The magnifier as described in claim 5, further comprising at least 2 prongs, said prongs being attached to said proximal and distal extensions of said frame; and
a. said prongs fixing said lens to said frame, said lens being centrally located to said window in said frame allowing a user to see through said lens and said window when said frame is rotated to a functional position.

* * * * *